US010259608B2

(12) United States Patent
Fianchini et al.

(10) Patent No.: US 10,259,608 B2
(45) Date of Patent: Apr. 16, 2019

(54) PLANT AND PROCESS FOR PREPARING DRUGS

(71) Applicant: AEA S.r.l., Rosora (IT)

(72) Inventors: Massimo Fianchini, Pioraco (IT); Sandro Bartolucci, Jesi (IT); Simone Giampieri, Polverigi (IT)

(73) Assignee: AEA S.R.L., Rosora (IT)

(*) Notice: Subject to any disclaimer, the term of this patent is extended or adjusted under 35 U.S.C. 154(b) by 0 days.

(21) Appl. No.: 15/673,538

(22) Filed: Aug. 10, 2017

(65) Prior Publication Data
US 2018/0044047 A1 Feb. 15, 2018

(30) Foreign Application Priority Data

Aug. 11, 2016 (IT) .................. 102016000084890

(51) Int. Cl.
*B65B 55/00* (2006.01)
*B65B 55/02* (2006.01)
(Continued)

(52) U.S. Cl.
CPC .......... *B65B 55/027* (2013.01); *A61J 7/0084* (2013.01); *B01F 13/10* (2013.01); *B01F 15/0087* (2013.01); *B25J 21/005* (2013.01); *B65B 3/003* (2013.01); *B65B 31/02* (2013.01); *B65B 43/46* (2013.01); *B65B 43/465* (2013.01); *B65B 43/50* (2013.01); *B65B 57/04* (2013.01); *B65B 61/28* (2013.01); *B65B 65/02* (2013.01); *B01F 2215/0032* (2013.01);
(Continued)

(58) Field of Classification Search
CPC ....... B65B 55/027; B65B 43/50; B65B 61/28; B65B 3/003; B65B 31/02; B65B 43/46; B65B 43/465; B65B 57/04; B65B 65/02; B65B 35/16; B65B 57/10; B01F 13/10; B01F 15/0087; B01F 2215/0032; B01F 2215/0034; A61J 7/0084; B25J 21/005; G07F 11/165; G07F 11/54; G07F 17/0092
See application file for complete search history.

(56) References Cited

U.S. PATENT DOCUMENTS

| | | |
|---|---|---|
| 5,451,528 A | 9/1995 | Raymoure et al. |
| 6,370,841 B1 | 4/2002 | Chudy et al. |
| 2006/0136095 A1* | 6/2006 | Rob ........................ A61J 1/20 700/245 |

* cited by examiner

*Primary Examiner* — Anshu Bhatia
(74) *Attorney, Agent, or Firm* — Lieberman & Brandsdorfer, LLC

(57) ABSTRACT

The embodiments include a plant for the preparation of drugs. A casing defining at least one storage chamber in communication with at least one preparation chamber by a passage opening is provided. A compartment in the storage chamber is configured to receive a plurality of base components suitable for containing substances for the preparation of drugs. A manipulator is housed in the preparation chamber and configured to define a loading condition. The manipulator takes at least one base component from the compartment and positions it in the preparation chamber. The manipulator is configured to combine substances contained in the base components brought into the preparation chamber to form at least one finished product containing a drug. The plant includes a control unit configured to command the rotation of the component, the loading position to the manipulator, and the working condition to the manipulator for the preparation of the finished product.

18 Claims, 16 Drawing Sheets

(51) Int. Cl.
*A61J 7/00* (2006.01)
*B01F 13/10* (2006.01)
*B01F 15/00* (2006.01)
*B65B 31/02* (2006.01)
*B65B 43/46* (2006.01)
*B65B 43/50* (2006.01)
*B65B 57/04* (2006.01)
*B65B 61/28* (2006.01)
*B65B 65/02* (2006.01)
*B25J 21/00* (2006.01)
*B65B 3/00* (2006.01)
*G07F 11/16* (2006.01)
*G07F 11/54* (2006.01)
*G07F 17/00* (2006.01)
*B65B 35/16* (2006.01)
*B65B 57/10* (2006.01)

(52) U.S. Cl.
CPC ....... *B01F 2215/0034* (2013.01); *B65B 35/16* (2013.01); *B65B 57/10* (2013.01); *G07F 11/165* (2013.01); *G07F 11/54* (2013.01); *G07F 17/0092* (2013.01)

PLANT AND PROCESS FOR PREPARING DRUGS

CROSS REFERENCE TO RELATED APPLICATION(S)

This application claims priority under 35 U.S.C. § 119 from Italy Patent Application No. 102016000084890 filed on Aug. 11, 2016, the entire contents of which are incorporated herein by reference.

BACKGROUND

The embodiments relate to a plant and a process for the preparation of drugs. The embodiments may find beneficial application in the medical, pharmaceutical and hospital fields, for the preparation of drugs.

The preparation of drugs is a complex process which requires extreme precision in handling and mixing the basic substances used in the formulation of the finished product (drug); in fact, for the correct production of the drug it is of fundamental importance to define precise dosages of active ingredients and excipients.

The preparation of drugs is also a highly sensitive process which requires a high level of care in the treatment of the basic substances and final preparations in order to prevent contamination. It is also to be noted that the basic substances used for the production of the drug, as well as the drug itself, may be toxic to humans (for example, preparations for chemotherapy treatments); it is essential therefore, to provide for safety measures which will prevent the contamination of the operators assigned to the preparation of the drugs.

The process is now delegated to specific installations, generally housed in cleanrooms where a fixed level of sterility of the environment is ensured; in this way, the plant can operate in sterile conditions, protecting both the operators as well as the drugs. An example of a plant for the preparation of drugs includes a casing in which there is a storage chamber and a preparation chamber: the two rooms are flanked and placed in communication through a passage opening located on a divider between those rooms. The storage chamber includes a front opening which allows access to an operator. Inside the storage chamber there is a compartment arranged to receive from the operator various base components (such as bottles, bags or syringes), each containing a substance for the preparation of the drug. In addition the compartment is arranged to receive various finished products (always in the shape of bottles, syringes or bags), containing the drugs arriving from the preparation chamber.

In more detail, the operator, thanks to the storage chamber access, places the base components on special gripping devices for the warehouse; the grippers are located exclusively on a lateral, external wall of the warehouse. The warehouse is arranged to allow movement inside the storage room and to bring the base components loaded by the operator from the front at the passage opening. Within the preparation room there is located an anthropomorphic robot, configured to take, through the passage opening, the base components uploaded to the compartment and bring the latter into the preparation room; the robot is also configured to appropriately combine the building blocks in order to obtain one or more finished products containing medicinal products.

Once it has prepared the drug, the anthropomorphic robot places the finished products, always through the passage opening, onto the compartment which is configured to carry the drugs to the front opening of the storage chamber so that the finished product can be picked up by the operator.

Although the system described above allows for the precise and safe management of dosages in the preparation of drugs, the applicant notes that this known plant is not free from limitations and drawbacks. In particular, it is noted that the compartment, configured to receive the plurality of base components and finished products on an external lateral side, has a limited carrying capacity which consequently impacts considerably on the production capacity of the entire plant, with the need for an operator.

It is also to be noted that the placement of the base components and finished products on a single external side wall of the compartment may cause the operator to inadvertently pick up a base component instead of a finished product (drug), or vice versa, to upload a finished product instead of a base component. In this way, a basic substance may be incorrectly classified as a finished drug or a medicinal product may not be properly prepared; in both cases, the incorrect operation may involve the entire plant, which could lead to the production of incorrect drugs which, if administered to a patient, may affect their health.

SUMMARY

The object of the embodiments is to practically solve at least one of the drawbacks and/or limitations of previous solutions.

A first objective of the embodiment is to provide a facility for the extremely effective preparation of drugs, which can ensure rapid and accurate preparation of drugs while maintaining the correct degree of safety required to prevent unwanted contamination of operators and of the drugs themselves during preparation.

It is also the purpose of the present embodiments to provide a facility for the preparation of drugs featuring a high production capacity while maintaining the required accuracy in the management of the dosages of the basic substances used for the creation of the drug and a high degree of safety.

It is also the objective of the embodiments to provide a facility for the preparation of drugs which is able to avoid the improper loading of the basic substances and ultimately, the incorrect preparation of medicines.

It is then the purpose of the embodiments to provide a facility for the preparation of drugs featuring a high production capacity and which is also flexible in its use; in particular, the embodiments aim to provide a facility which can be used for the production of drugs of any type both in small and large quantities, and at the same time presenting a compact structure.

A further aim of the embodiments is to provide a process for the preparation of drugs which is quick and safe, especially able to ensure the proper preparation of drugs and avoiding that the drugs, or the operators managing the process, may be undesirably contaminated.

These purposes and others, which appear further in the description below, are achieved fundamentally by a plant and a process for the preparation of drugs in accordance with that expressed in one or more of the claims included, and/or, of the following aspects, both taken alone or in any combination with each other or in combination with any of the claims included and/or in combination with any of the other aspects or features described below.

BRIEF DESCRIPTION OF THE DRAWINGS

Some forms of the achievement and some aspects of the embodiments are described below, with reference to the drawings enclosed, which are provided for guidance purposes only and should not therefore be regarded as an exhaustive description.

DETAILED DESCRIPTION

Figure 1:
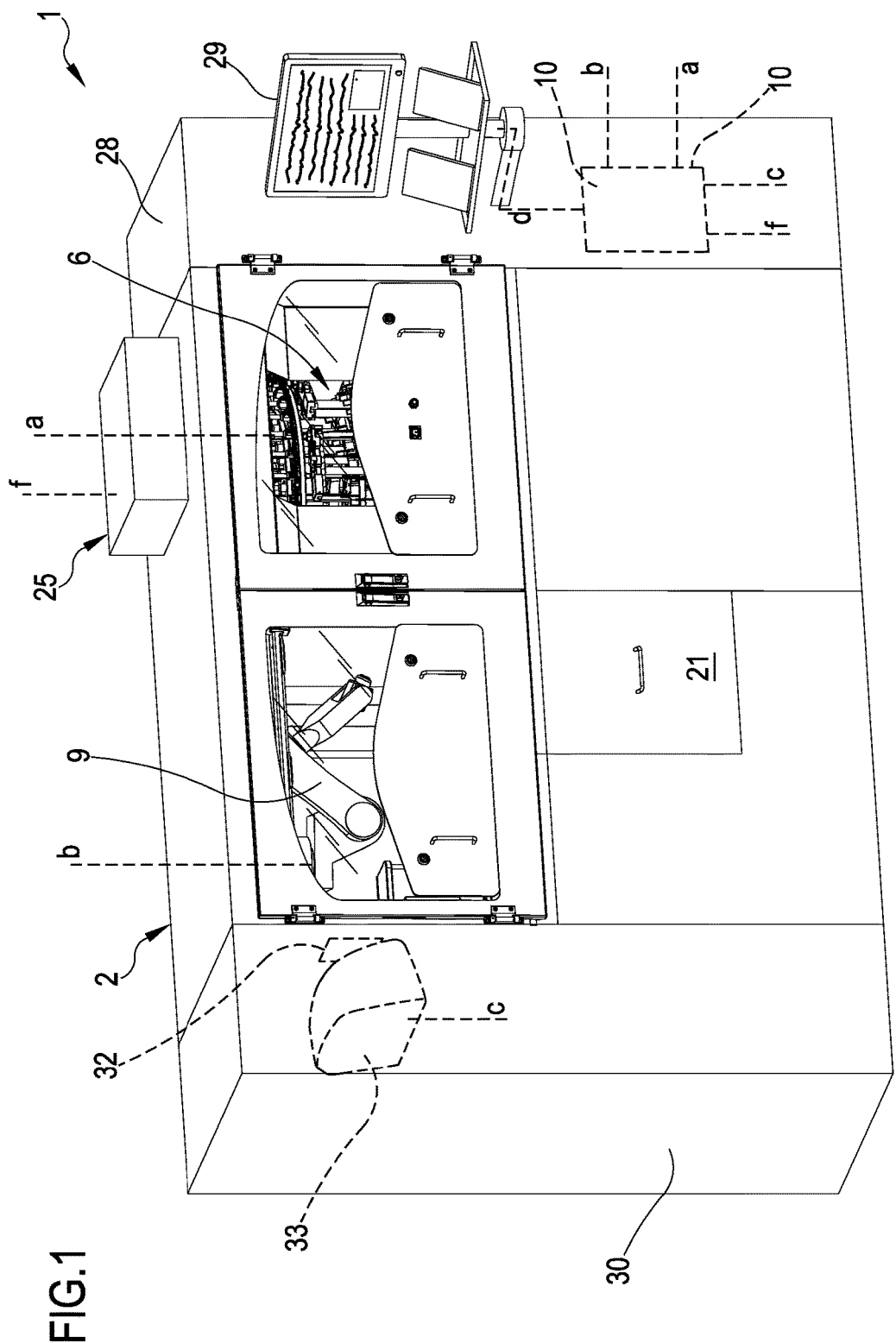
FIG. 1 is a perspective view of a plant in accordance with the embodiments.
Figure 2:
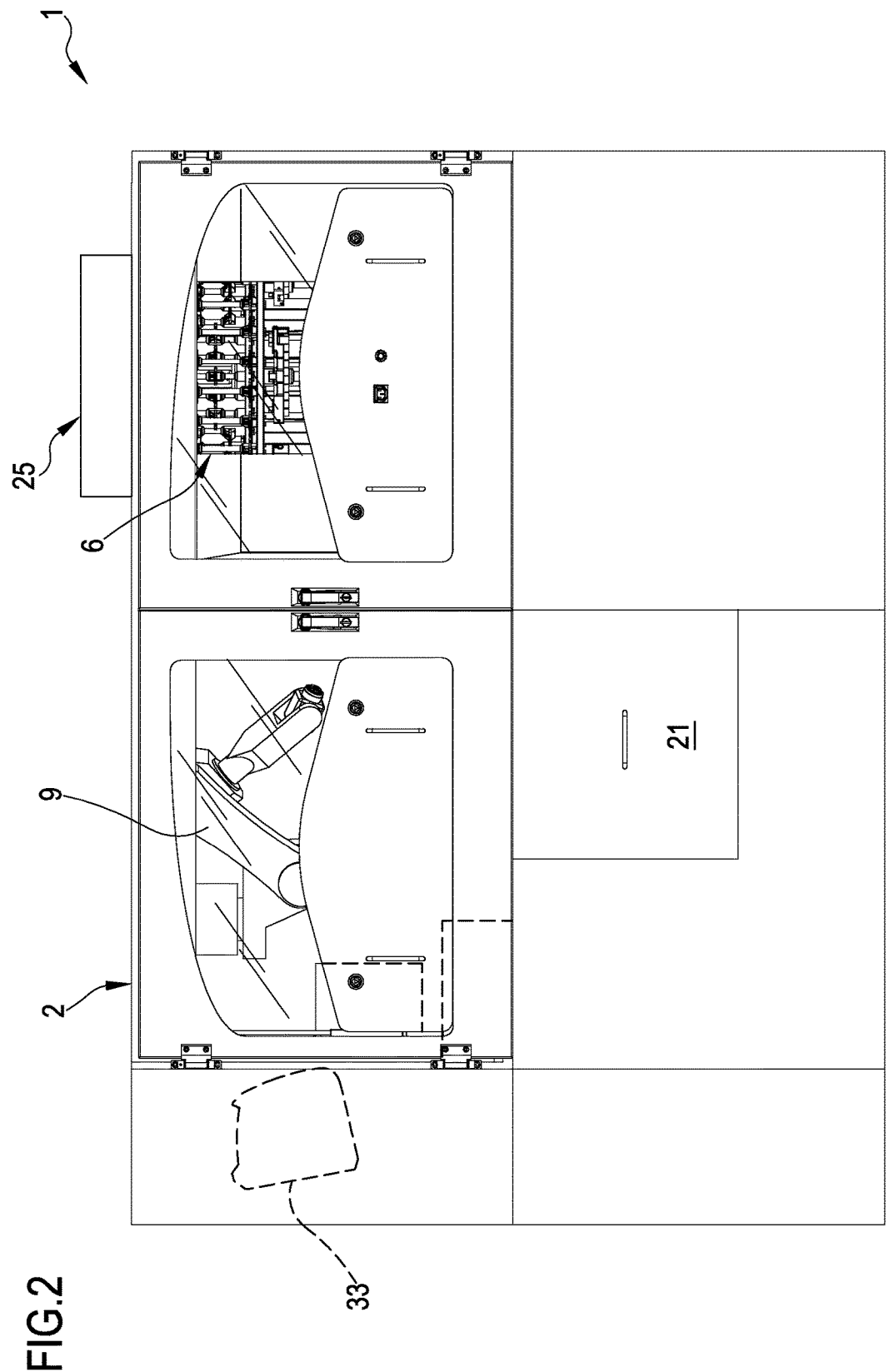
FIG. 2 is a schematic frontal view of a plant in accordance with the present embodiments.

It is to be noted that in this detailed description relevant parts discussed in the various figures are indicated with the same number references. The figures may describe the object of the embodiments through non-scaled representations; therefore, parts and components shown in the figures relating to the subject matter of the embodiments could only relate to schematic representations.

The term drug includes any substance or combination of substances presented as having properties for treating or preventing illness in human beings. As medicinal product is intended any substance or combination of substances which may be used on living beings such as humans or administered to humans for the purpose of restoring, correcting or modifying physiological functions by exerting a pharmacological, immunological or metabolic action, or for making a medical diagnosis.

The term substance includes at least one or more active ingredients or one or more excipients used.

The term control unit describes an electronic component which may include at least one of: a digital processor (CPU), memory (or memories), an analog circuit, or a combination of one or more digital processing unit with one or more analog circuits. The control unit can be "configured" or "programmed" to perform certain steps: this can be achieved in practice by any means which allows configuration or programming of the control unit. For example, with a control unit comprising one or more CPUs and one or more memories, one or more programs can be stored in appropriate memory banks connected to the CPU or CPUs; the program or programs contain instructions which, when executed by the CPU or the CPUs, schedule or configure the control unit to perform the operations described in relation to the control unit. Alternatively, if the control unit is analog or has analog circuitry, then the circuit of the control unit can be designed to include circuitry configured, in use, to process electrical signals so as to perform the steps related to the control unit.

Plant for the Preparation of Drugs

Number 1 indicates overall a plant for the preparation of drugs such as usable in the medical, hospital and pharmaceutical fields for the preparation of drugs.

As seen in FIGS. 1-4, plant 1 includes a casing 2 configured to basically define the frame of the plant 1 to enable it to stand on the floor. Such as seen for example in the partial views of FIGS. 3 and 4, the casing 2 defines at least one storage chamber 3 and at least one preparation chamber 4, flanked and communicating with each other by means of at least one passage opening 5. In particular, the storage chamber 3 is divided from the preparation chamber 4 by means of a divider 24 (FIGS. 3 and 4) on which the passage opening 5 is located: the divider 24 basically divides the two chambers 3, 4 which are in direct fluid communication through the sole passage opening 5. The annexed figures describe, but are not limited to, a configuration of the plant which includes one only passage opening 5; the possibility of creating a divider 24 comprising two or more openings 5 is not ruled out.

The annexed figure describes, without it representing a limitation, a storage chamber with a box-shaped form and an internal volume of less than 1 m³.

As is further described, inside the storage chamber 3 there is a compartment 6 (see for example FIG. 1) configured to receive a plurality of base components B able to contain substances for the preparation of the sterile drugs.

The storage chamber 3 includes an inlet 18 configured to allow the access, on the part of an operator or of an external automated system, to chamber 3. In particular, inlet 18 faces compartment 6 and is configured to allow access, on the part of an operator or of an external automated system, to the compartment 6. In fact, chamber 3 is a closed container: only through inlet 18 it is possible to access, from outside, storage chamber 3. In further detail, inlet 18, according to an in use condition of plant 1, is defined as being located on a lateral wall of chamber 3 which, alongside a lower and an upper wall, defines the container of chamber 3 itself. Such as is schematized in FIG. 3, the storage chamber's lateral wall comprises the divider 24: the passage opening 5 and inlet 18 are both defined as being located on the lateral wall delimiting storage chamber 3. However, passage opening 5 and inlet 18 are spaced and distinguished.

In a preferential form of installation, but without it representing a limitation to the embodiments, storage chamber 3 also comprises a ventilation circuit 25 featuring at least one blowing opening and one intake opening defined respectively on the upper and lower wall of storage chamber 3; in particular, blowing and intake opening are opposite and both facing compartment (6). Ventilation circuit 25 is configured for generating a gaseous fluid flow passing through storage chamber 3 and adapted to strike compartment 6 along a predetermined direction which, when plant 1 is in use, is essentially vertical.

As briefly mentioned above, plant 1 comprises a compartment 6 located within storage chamber 3. In further detail, compartment 6 extends between first and second longitudinal ends, respectively facing the upper and lower walls of chamber 3.

In further detail, compartment 6 comprises at least one outer sector 7 configured to house a predetermined number of base components B and to rotate around a respective axis A; compartment 6 comprises also at least one inner sector 8, also configured to house a predetermined number of base components B and to rotate around a respective axis A; inner sector 8 is at least partially housed within outer sector 7. Advantageously, inner sector 8 and outer sector 7 have a parallel rotation axis. In further detail, outer sector 7 and inner sector 8 show, in a plan view, a substantially circular perimeter shape and are placed in relation to each other in concentric positions: outer sector 7 and inner sector 8 have the same rotation axis A.

Figure 5:
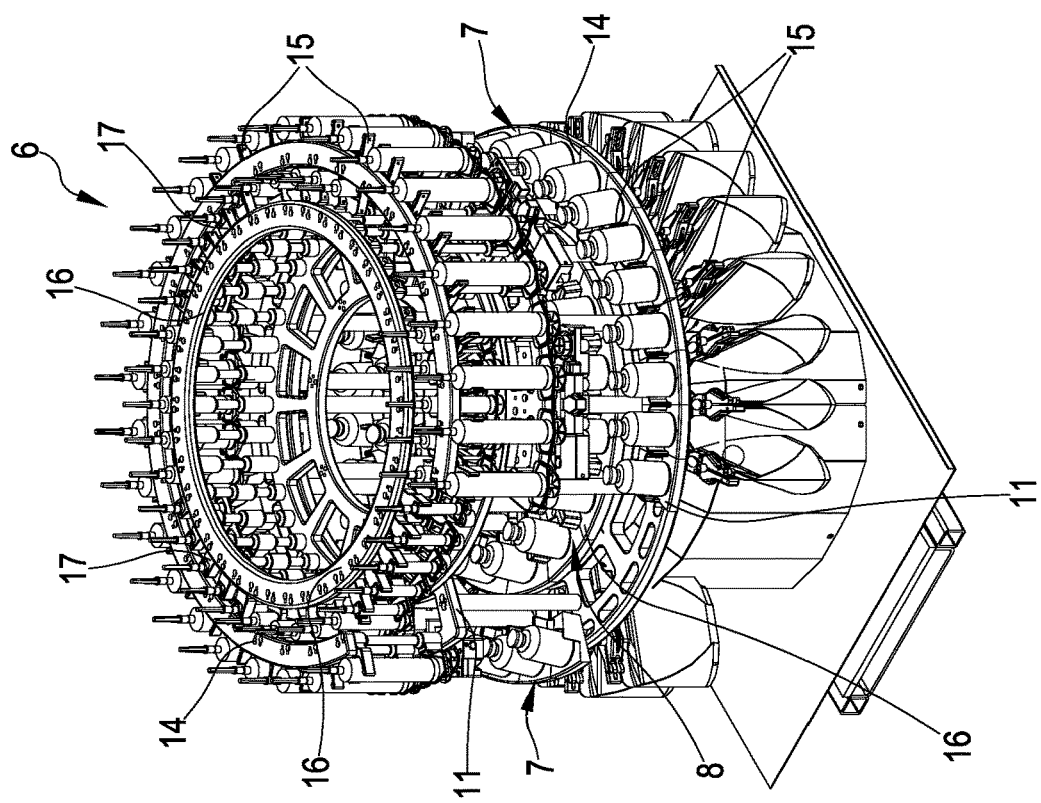
FIG. 5 is a schematic view of a compartment of a plant in accordance with the embodiments.
Figure 7:
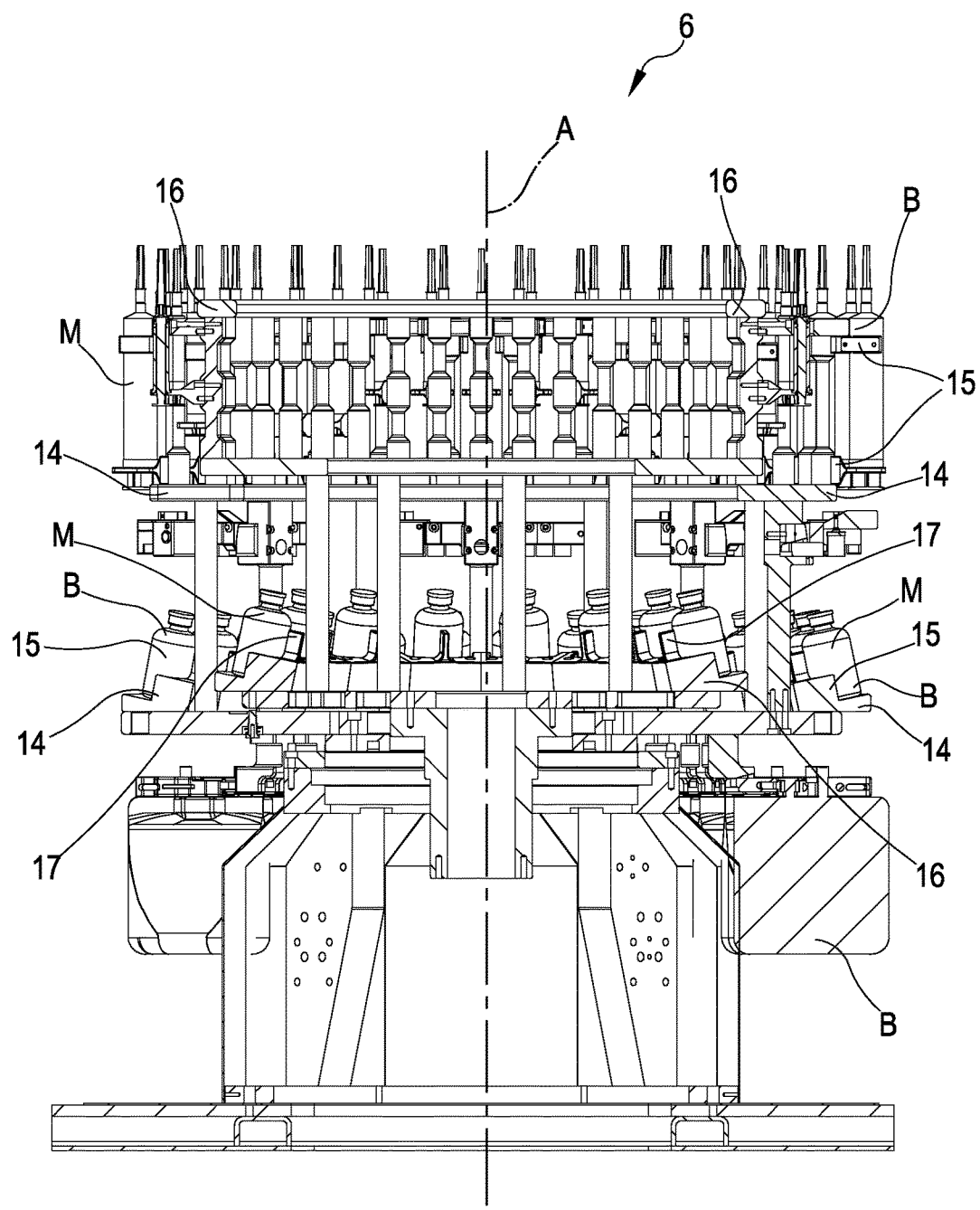
FIG. 7 is a section view of a compartment of a plant in accordance with the embodiments.

As shown in the annexed figures, outer sector 7 shows a side opening 11 (see for example FIG. 5) defining a side passage which enables access from outside the compartment to inner sector 8. In particular, outer sector 7 shows, according to a section transversal to the respective rotation axis A, a substantially circular open outline delimiting, at the aperture of the outline, the side opening 11. The inner sector features instead, according to a cross section in relation to the respective rotation axis A of such sector, a substantially circular closed outline. In fact, at least one portion of the inner sector 8 is located at the side passage seat of the outer sector 7.

The annexed figures include a representation of the configuration of compartment 6, wherein the inner sector is entirely located within the outer sector 7; the side opening 11 of the outer sector extends along the entire axis of the inner sector 8. Advantageously, sectors 7, 8 feature essentially the same extension along the axis (extension along axis of rotation A, i.e. lengthwise); in such condition, the side opening 11 extends along the entire axis of the outer sector 7.

The annexed figures feature a preferential configuration, without it representing a limitation, of plant 1 comprising an outer sector 7 and only one inner sector 8; the possibility to create an outer sector 7, at least one middle sector (not shown in the annexed figures), and at least one inner sector defining a compartment 6 with more than 2 sectors is not ruled out; the middle sector may advantageously feature the same structure of the outer sector, i.e. according to a plan view, showing a substantially circular perimeter shape: the middle sector can be placed in relation to the inner sector and the outer sector in a concentric position and therefore, respectively show an axis of rotation coinciding with the axis of rotation A of sectors 7 and 8. If present, the middle sector includes the side opening 11 which enables access from outside the compartment to inner sector 8.

Figure 8:
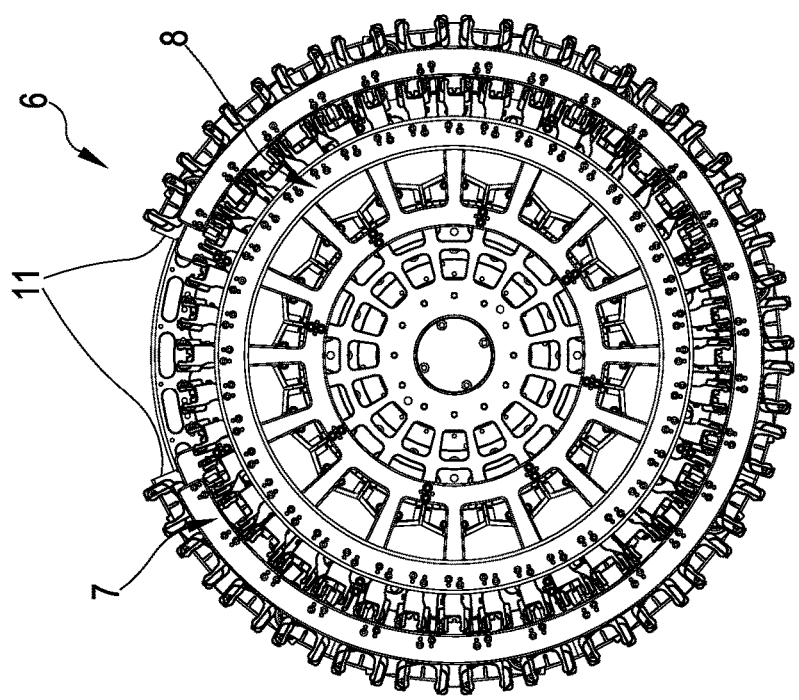
FIG. 8 is a schematic view from above of a compartment of a plant in accordance with the embodiments.
Figure 10:
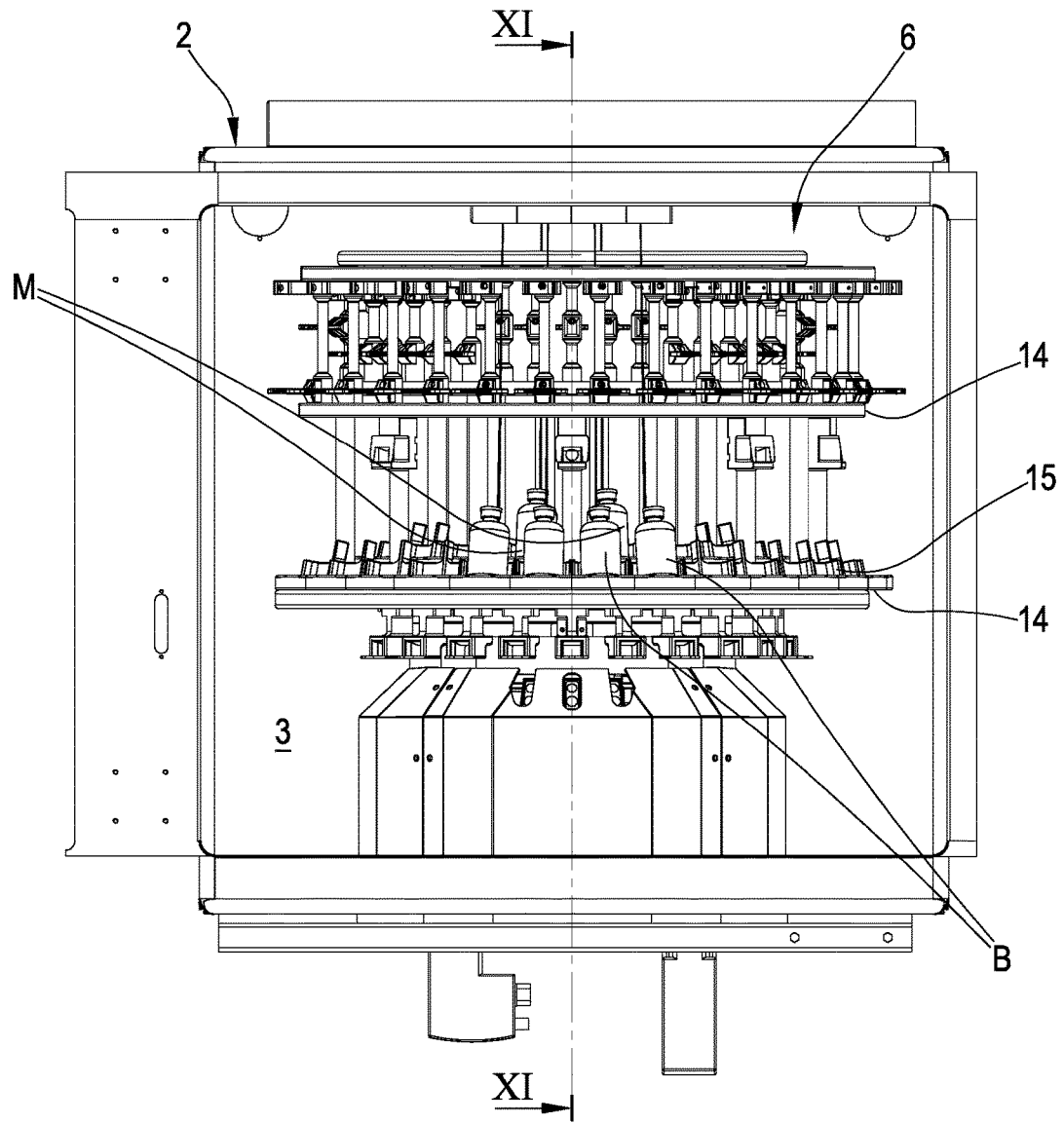
FIG. 10 is a partial front detail view of a plant in accordance with the embodiments.

As regards the structure, the outer sector 7 comprises at least one crown featuring an open circular outline; in a position radially within outer sector 7 inner sector 8 is located comprising at least one crown featuring a closed circular outline. Inner sector 8 defines a through seat extending all along the entire length of the inner sector 8 itself. The annexed figures show a preferential form of installation, which does not represent a limitation to the embodiments, wherein the outer sector 7 comprises a plurality of circular crowns spaced along the axis of rotation A of the respective sector 7 and connected through a number of spacers. In the same way, inner sector 8 comprises a number of circular outline crowns spaced along the axis of rotation A of sector 8 and connected through a number of spacers. Each crown of the inner and outer sectors comprises a plurality of openings crossing the thickness of the crown, the plurality of crossing openings of the crown being uniformly distributed along the outline of the latter. In particular, such crossing openings are foreseen along the entire perimeter of the inner sector and outer sector; such as shown in FIG. 8, the crossing openings are close to each other and affect the entire perimeter of sectors 7, 8.

Advantageously, the axis of rotation A of sectors 7, 8 is placed along the direction of the gaseous fluid flow generated by the ventilation circuit 25: the gaseous fluid flow crossing the storage chamber 3 strikes the compartment 6 along a direction parallel to the axis of rotation A of the first and second sectors. The perforated crowns of the inner sector and outer sector allow the gaseous fluid flow generated by circuit 25 to cross the storage chamber 3 and, in particular, compartment 6 without causing disturbances; the gaseous fluid flow is linear and allows the generation of a type of barrier within the storage chamber 3 able to prevent contamination of chamber 3 itself and in particular to preparation chamber 4. In addition, the openings show a particular shape and are placed on the sectors so as to allow the gaseous fluid flow generated by ventilation circuit 25 to wash the surfaces of compartment 6 in order to ensure within chamber 3 (as well as within preparation chamber 4) an appropriate level of sterility.

As shown for example in FIGS. 5, 7, 11 and 16, the outer sector 7 comprises a plurality of outer levels 14, overlapped and consecutive to each other along a direction defined by the rotation axis A of the outer sector 7 itself; each outer level 14 comprises a plurality of gripping members 15, each of which is configured for engagingly receiving and supporting at least one base component B. Advantageously the gripping members 15 of each outer level 14 are placed at an outer edge portion of the outer sector 7 along a substantially circular trajectory and are able to take up the entire perimeter of sector 7. The annexed figures show a preferential form of installation, which however does not represent a limitation to the embodiments, wherein the external levels 14 comprise a respective number of gripping members 15 which differ depending on external level. For example, one level 14 may include gripping members 15 configured to engage base components B in the form of syringes: for example, such gripping members 15 may include grippers or clips. One or more outer levels 14 may instead include gripping members configured for supporting base components in the form of bottles and/or bags, or again a different type of sterile base component B. The annexed figures show a preferential form of installation, which does not represent a limitation to the embodiments, in which the compartment 6 comprises a lower outer level 14 configured for supporting bags, a middle outer level configured for supporting bottles and an upper outer level for supporting syringes; each level 14 is configured to support a specific type of base component B. The possibility of realizing an outer level with a number of levels 14 of less than or more than 3 is not ruled out.

As shown for example in FIGS. 5, 7, 11 and 16, the inner sector 8 comprises a plurality of outer levels 16, overlapped and consecutive to each other along a direction defined by the rotation axis A of the inner sector 7 itself; each outer level 16 comprises a plurality of gripping members 17, each of which is configured for engagingly receiving and supporting at least one base component B. Advantageously the gripping members 17 of each inner level 16 (similarly to the outer sector 7) are placed at an outer edge portion of sector 8 along a substantially circular trajectory and are able to take up the entire perimeter of sector 8. The annexed figures show a preferential form of installation, which does not represent a limitation to the embodiments, in which the inner levels 16 comprise a plurality of gripping members 17 different for each inner level. For example, one level 16 may include gripping members 17 configured to engage base components B in the form of syringes: for example such gripping members 17 may include grippers or clips. One or more inner levels 16 may instead include gripping members configured for supporting base components in the form of bottles and/or bags, or again a different type of sterile base component B.

The annexed figures show a preferential form of installation, which does not represent a limitation to the embodiments, in which the compartment 6 comprises an upper inner level 16 configured for supporting syringes and a lower level configured for supporting bottles; each level 16 is configured to support a specific type of base component B. The possibility of realizing an inner level with a number of levels 16 of less than or more than 2 is not ruled out.

The annexed figures show a form of installation, without this representing a limitation to plant 1, in which the inner levels 16 of sector 8 are aligned to the outer levels 14 along a plane perpendicular to such axes of rotation A of the inner and outer sectors. In particular, the outer level 14 configured to support a plurality of syringes (upper outer level) is adjacent and aligned with the upper inner level of inner sector 8, which is also configured to support a plurality of syringes. The outer middle level configured to support a plurality of bottles is adjacent and aligned with the lower inner level of inner sector 8, which is also configured to support a plurality of bottles. Compartment 6 is therefore configured to place the same type of base component B (in the example, which does not represent a limitation, shown in the figures, such base components are syringes and bottles) at the same level, i.e. at the same height with respect to compartment 6. The possibility of realizing outer and inner levels displaced one with the other along the axis of rotation A is not ruled out.

As described above, the outer sector 7 comprises a side opening 11: advantageously, such side opening 11 extends along the axis all a height of the sector 8, along the entire plurality of its inner levels 16 of this latter.

In addition, as described above, sectors 7, 8 are configured to rotate around their respective axes A (in particular, around a unique axis A); the inlet 18 of storage chamber 3 faces the compartment 6 according to a direction perpendicular to the axis of rotation A of the outer and/or inner sector 7, 8. Also the opening passage 5 faces compartment 6 and has an angular displacement compared to the inlet 18 by an angle Δ measured according to a plane perpendicular to the axis of rotation A of the outer and inner sector 7, 8 and bordered by two imaginary rays having the same origin on such axis A and passing one through a centerline plan of the passage opening 5 and the other through a centerline plan of the inlet 18. In particular, angle Δ is advantageously between 50° and 270°, optionally between 80° and 200°, and even more specifically about 90°.

Figure 9:
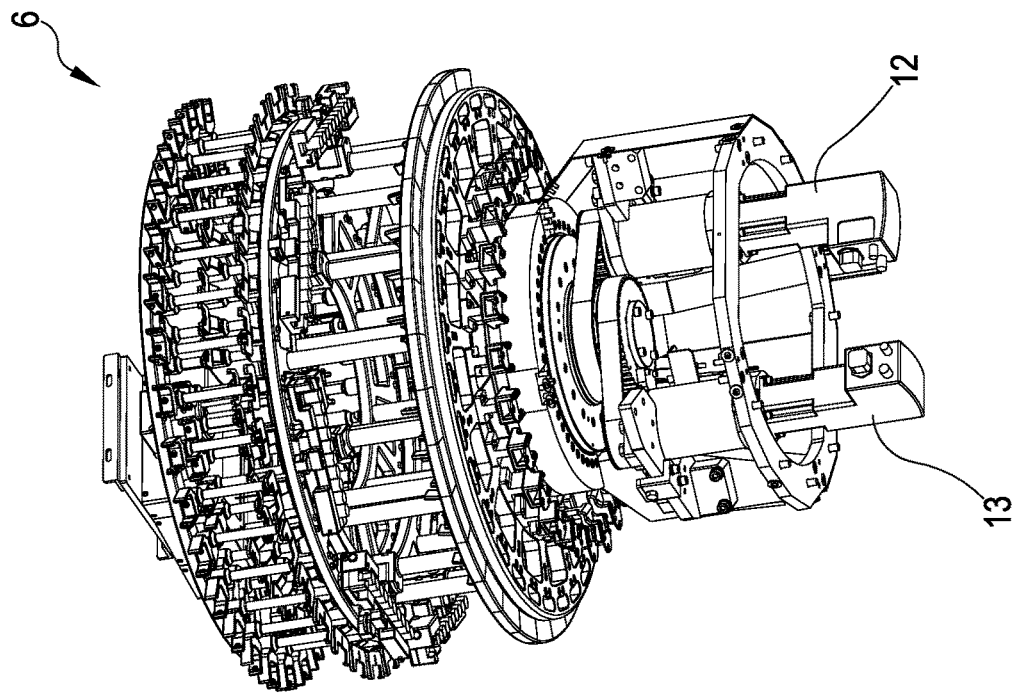
FIG. 9 is a partial perspective view from below of a compartment of a plant in accordance with the embodiments.

Advantageously, the outer and inner sectors 7, 8 are relatively mobile by rotation one with respect to the other, in particular by rotation around the same rotation axis A. As shown in FIG. 9, plant 1 comprises at least one first motor 12, or, optionally, an electric motor, connected to the outer sector 8, which is configured to rotate such outer sector around axis A; plant 1 also comprises at least one second motor 13, or, optionally, an electric motor, connected to the inner sector 7, which is configured to rotate the outer sector 7 around axis A.

The motors are placed, with plant 1 in use, below the outer and inner sector, and housed in the casing 2. Each motor is active on a drive crown bound to its respective sector; for example, to the outer sector 7 there is fixed a toothed crown on which a drive belt connected to a toothed crown of the first motor 12. In the same way, to inner sector 8 there is fixed a toothed crown on which a drive belt is connected to a toothed crown of second motor 13. The motors and the drive crowns are placed, with plant 1 in use, below level 16 of inner sector 8 (for example, see FIG. 9).

Plant 1 comprises also a control unit 10 connected to the first and second motor 12, 13; the control unit 10 is configured to command motors 12, 13 independently of each other in order to determine the rotation of inner and outer sector 7, 8.

As described above, a casing 2 defines at least one preparation chamber 4, flanked to the storage chamber 3 featuring, without this representing a limitation, a box shape and an inner volume of less than 1 $m^3$. As shown for example in FIG. 1, the preparation chamber 4 comprises at least one side wall made at least partially of a transparent material which permits sight of the inner volume of chamber 4 from the outside; the side wall, at least partially in transparent material, is advantageously placed as a continuation of the side wall of chamber 3 supporting inlet 18 (FIG. 1).

As shown for example in FIG. 1, plant 1 comprises also at least one manipulator 9, for example, an anthropomorphic robot, housed in preparation chamber 4 and configured to define a loading condition, wherein manipulator 9 takes at least one base component B from compartment 6—through the passage opening 5—and places it in preparation chamber 4. Manipulator 9 is also configured to define a working condition wherein the same manipulator 9 combines the substances contained in the base components B brought into the preparation chamber 4 to create at least one finished product M containing a drug.

As described above, plant 1 comprises a control unit 10; such control unit 10 is connected to compartment 6 and to manipulator 9 and is configured to: determine at least one predetermined loading position of a base component B on the outer sector 7 of compartment 6, defined at one of the gripping members of the same outer sector 7, eventually, put in rotation the outer sector 7 so that the gripping member defining the predetermined loading position of the base component B results substantially facing the inlet 18 of storage chamber 3, and/or determine at least one predetermined loading position of a base component B on the inner sector 8 of compartment 6, defined by one gripping member of the same inner sector 8, eventually, put in rotation the outer sector 7 so that the gripping member defining the predetermined loading position of the base component B results substantially facing the inlet 18 of storage chamber 3, eventually, putting in rotation the outer sector 7 so that the side opening 11 faces the inlet 18 for enabling to gain access from the outside to the loading position of the inner sector 8.

In fact, the control unit 10 establishes the position on the outer sector and/or inner sector on which the base component B shall have to be loaded and consequently handles the outer and inner sectors in order for this loading position to be facing inlet 18. This way, the operator or an outer automated system can load the base component B on the loading position of compartment 6 set by control unit 10.

Advantageously, plant 1 comprises at least one first sensor 19 (advantageously in the annexed figures, represented as a plurality of first sensors 19 of plant 1) placed in the storage chamber 3, configured to issue a control signal indicating the presence of a base component B at the predetermined loading position on the outer sector 7.

Figure 11:
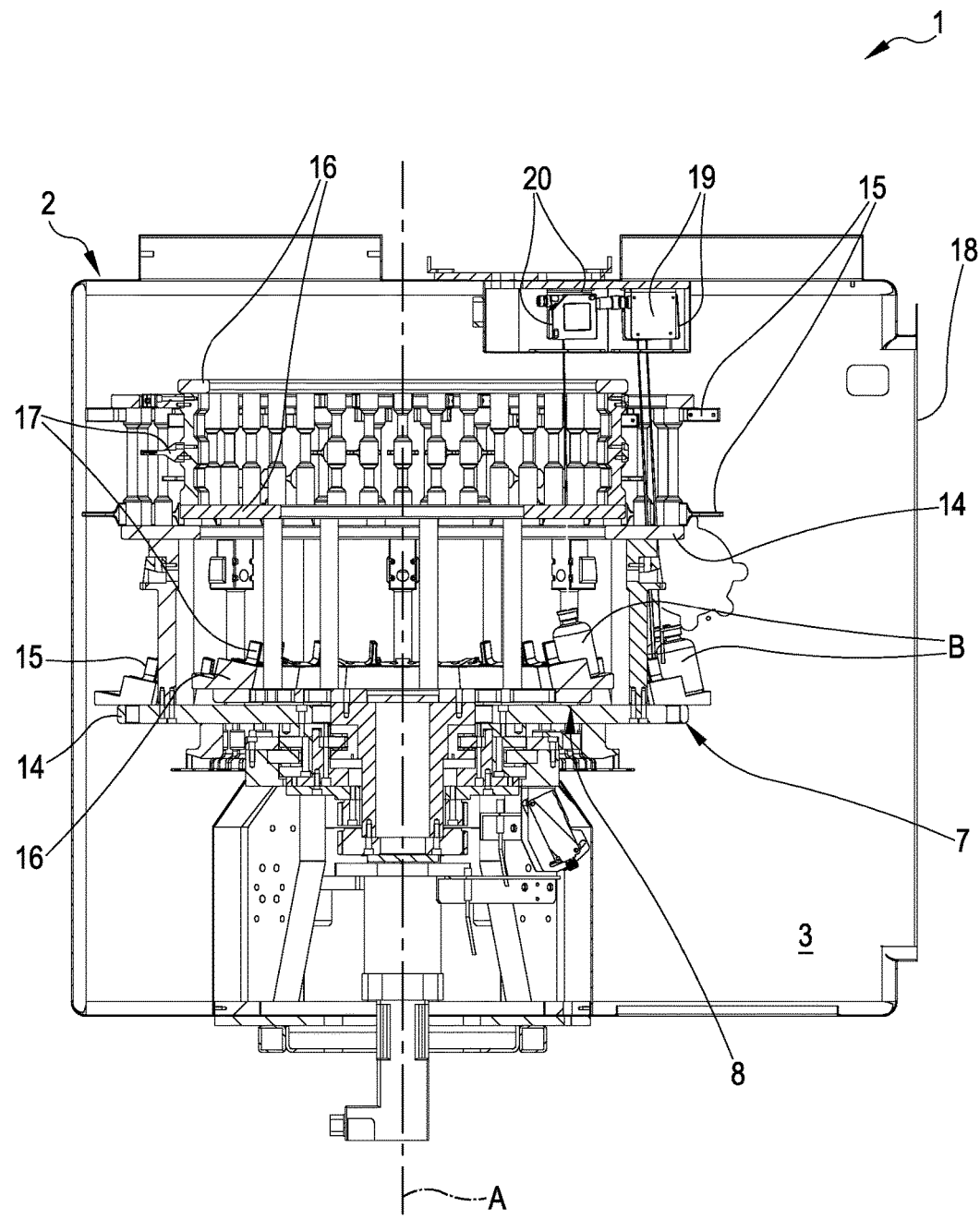
FIG. 11 is a section view, according to mark XI-XI, of the FIG. 10 plant.
Figure 12:
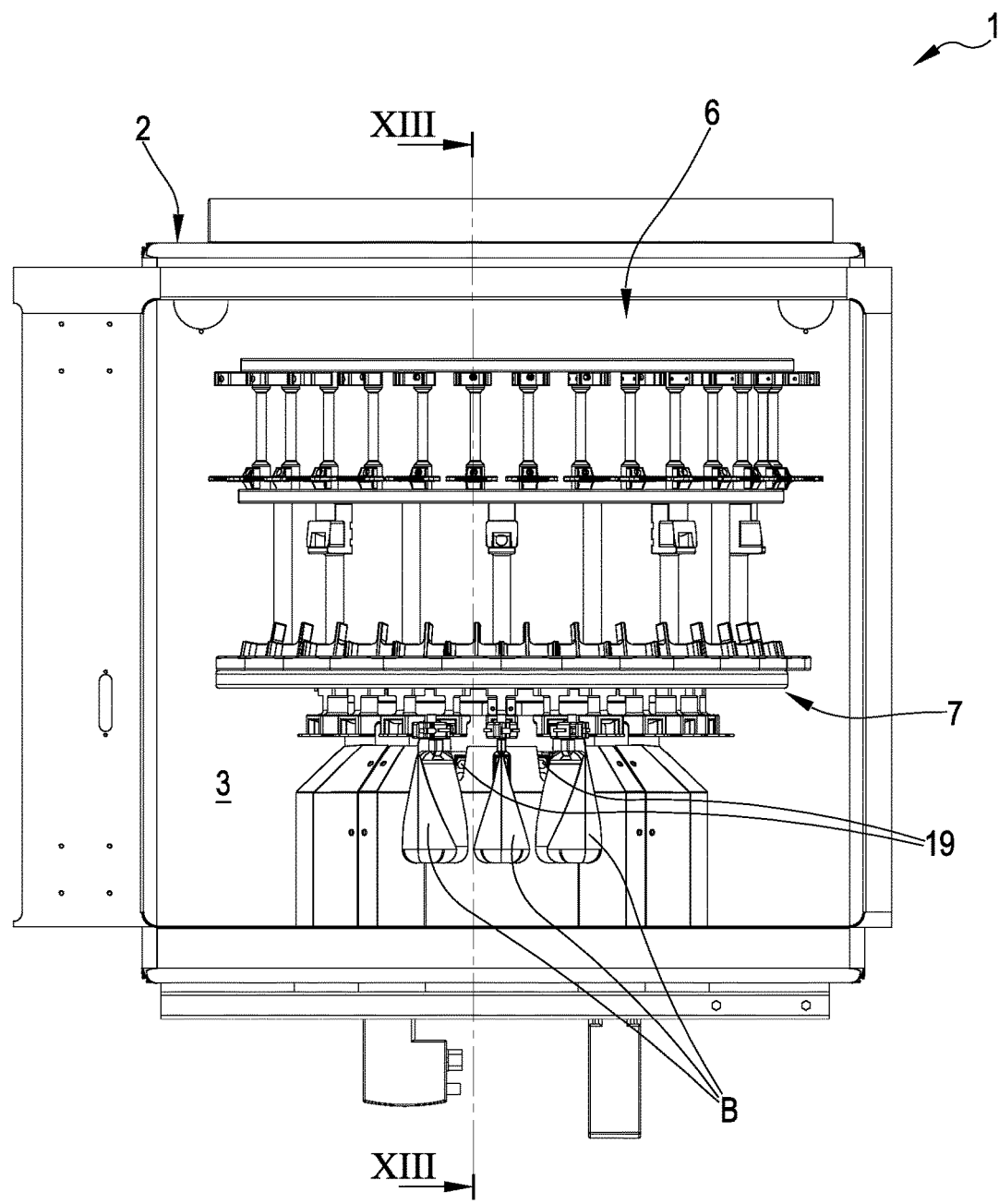
FIG. 12 is a further partial frontal detail view of a plant in accordance with the embodiments.
Figure 13:
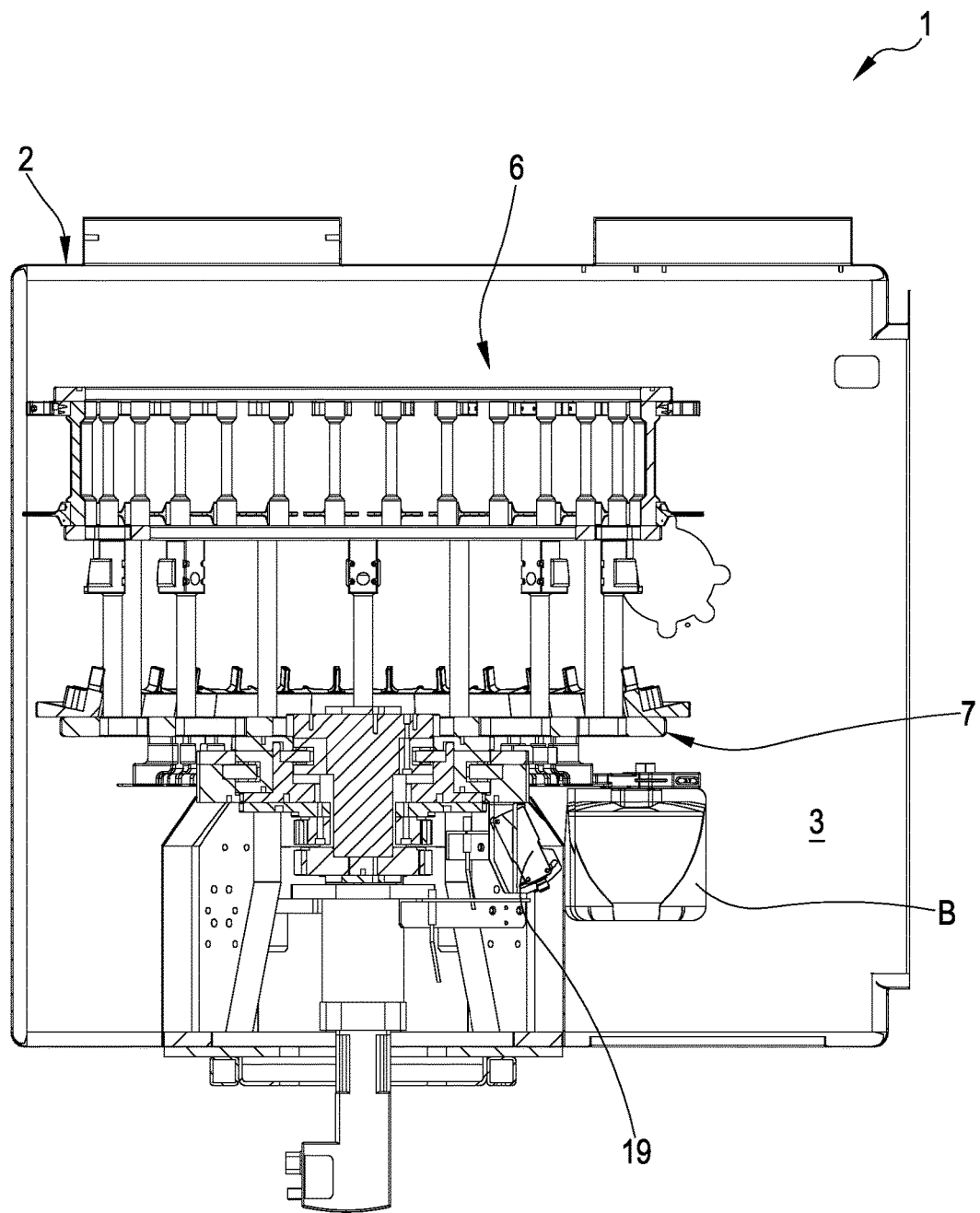
FIG. 13 is a section view, according to mark XIII-XIII, of the FIG. 12 plant.
Figure 14:
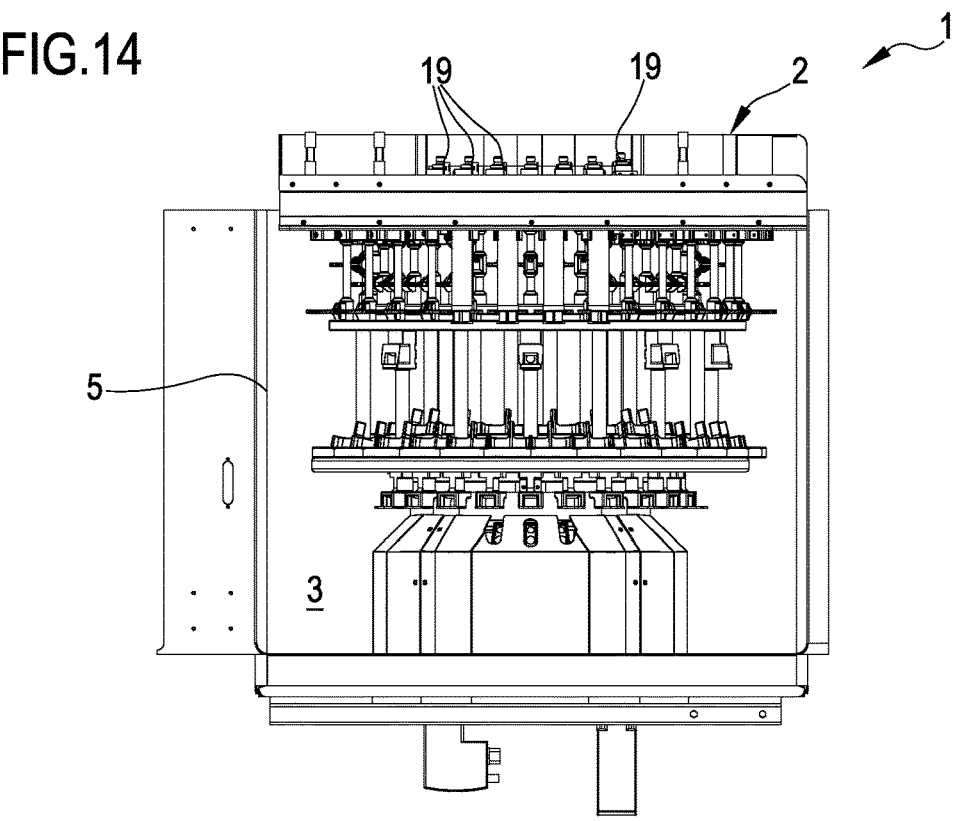
FIG. 14 is a further partial frontal detail view of a plant in accordance with the embodiments.
Figure 15:
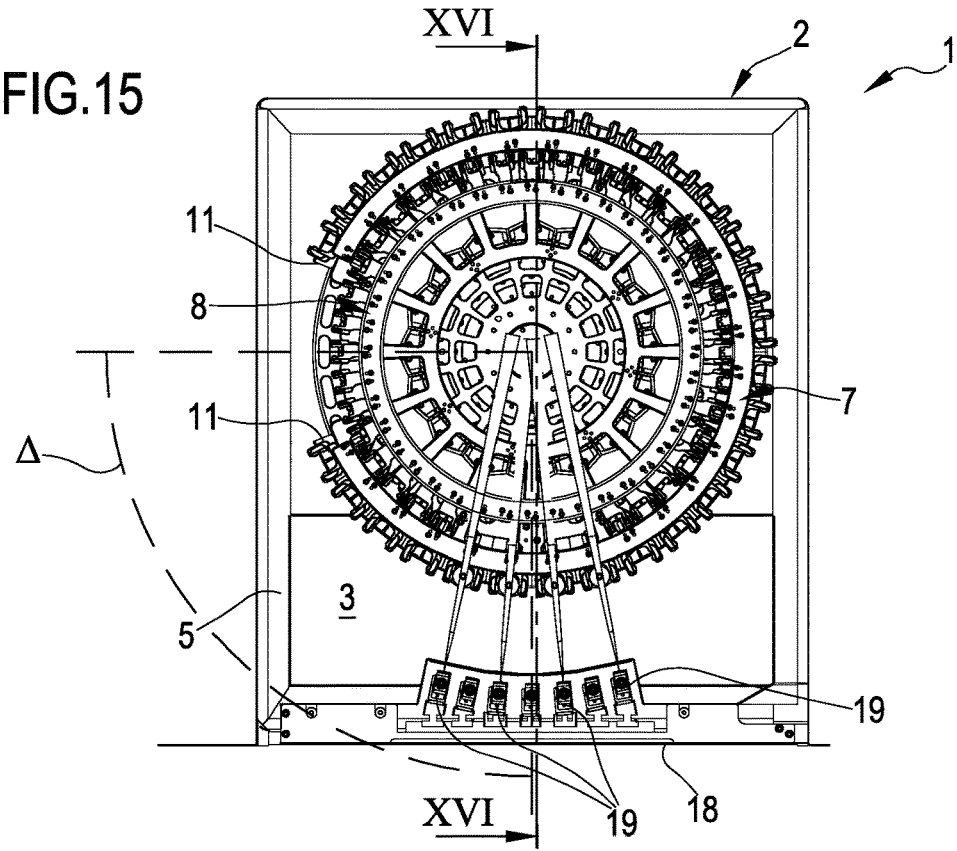
FIG. 15 is a partial view from above of a plant in accordance with the embodiments.
Figure 16:
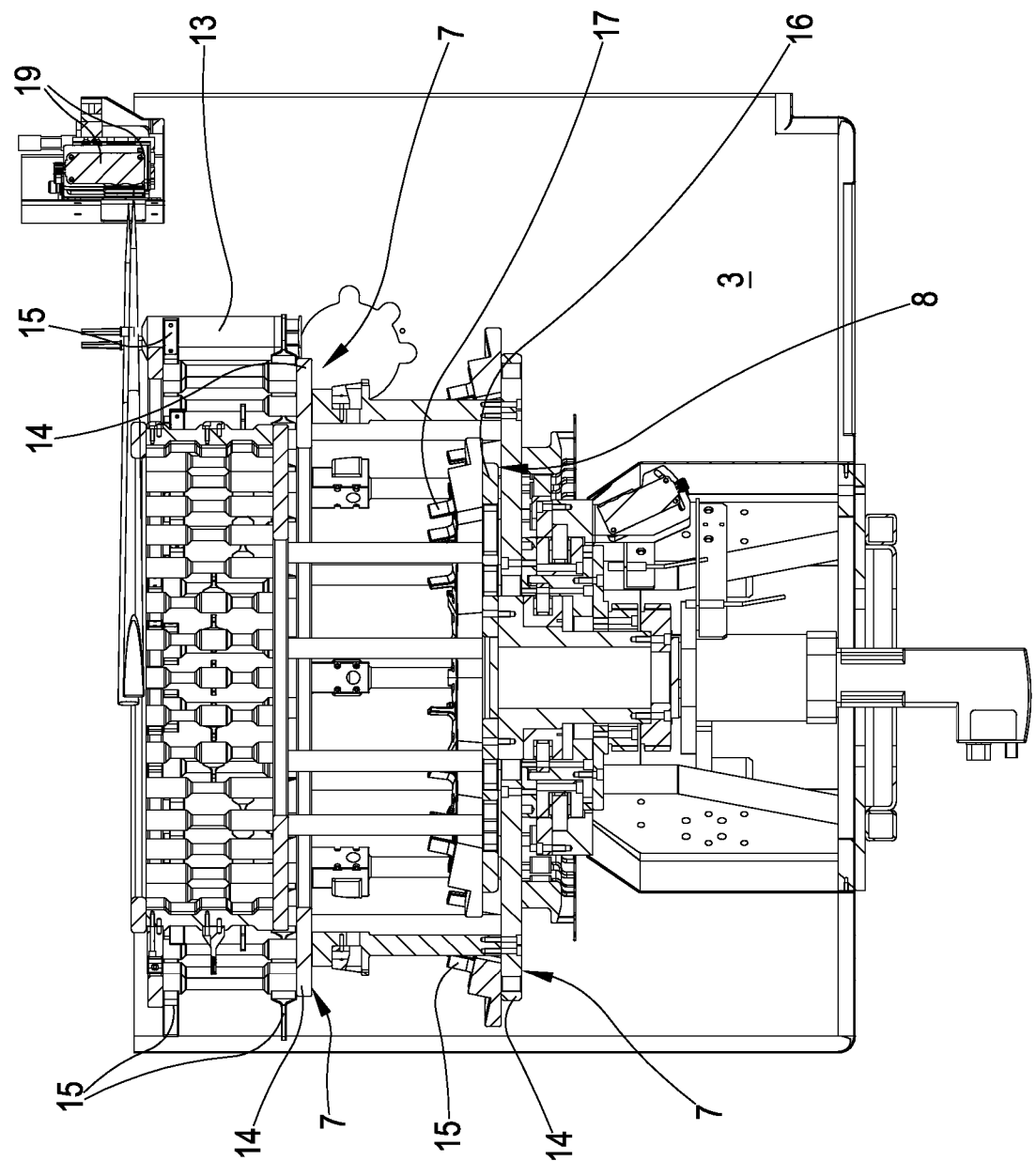
FIG. 16 is a section view, according to mark XVI-XVI of the FIG. 15 plant.

Plant 1 can comprise only one sensor 19 able to detect one or more loading positions for each of the outer levels 14 present; the plant can comprise one sensor 19 for each of the outer levels present, such as illustrated in FIGS. 11, 12 and 15. In particular, FIG. 11 shows a plurality of first sensors, each of which is able to detect at least one loading position on the middle outer level (level suitable for supporting bottles); each of such sensors 19, as illustrated in FIG. 15 is also configured to detect at least one loading position on the upper outer level (level suitable for supporting syringes). There is also a plurality of first sensors 19 (see FIG. 12) placed at the lower outer level: each of such sensors 19 is configured to detect at least one loading position on the lower outer level (level suitable for supporting bags). The control unit 10 is connected to the first sensor 19 and is configured for: receiving from the first sensor 19 the control signal; determining, based on the control signal, the presence of a base component B at the predetermined loading position; and optionally, if the presence of a base component (B) at the predetermined load position has been verified, identifying the base component and/or determining if the base component B is correctly positioned on the respective gripping member.

In fact, if the control unit 10 has set a loading position on the outer sector 7, the same unit 10 rotates such sector so that the same position results as facing inlet 18: through the sensor 19, the control unit checks the effective presence of the base component B on to the predetermined loading position. The first sensor 19 can advantageously comprise at least one selected from among the following groups: a presence detection sensor such as a mechanical, electromechanical or optical one; a proximity sensor, such as an inductive, capacitive, magnetic, ultrasonic or optical one; and a position sensor, such as an inductive, capacitive, magnetic, ultrasonic, optical or infrared one.

The control unit 10, through sensor 19, can also be configured to check (in addition to the effective presence of the base component at the predetermined loading position) that the component is in the correct position (if it was correctly engaged on the respective gripping member) or if the loaded base component is itself correct.

Figure 17:
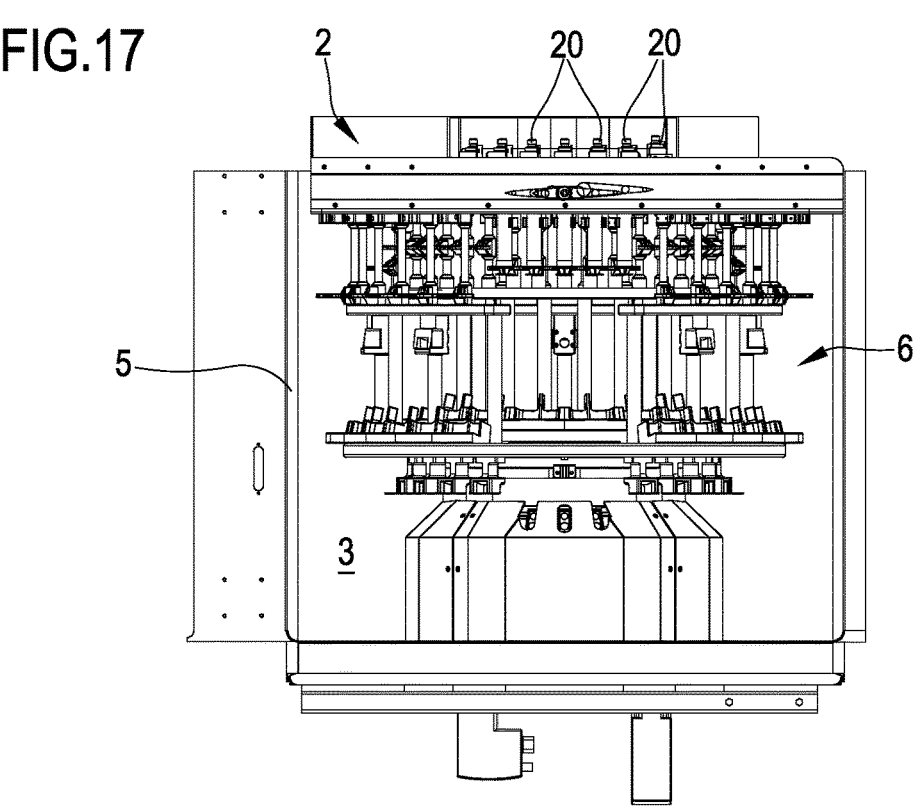
FIG. 17 is a further partial frontal detail view of a plant in accordance with the embodiments.
Figure 18:
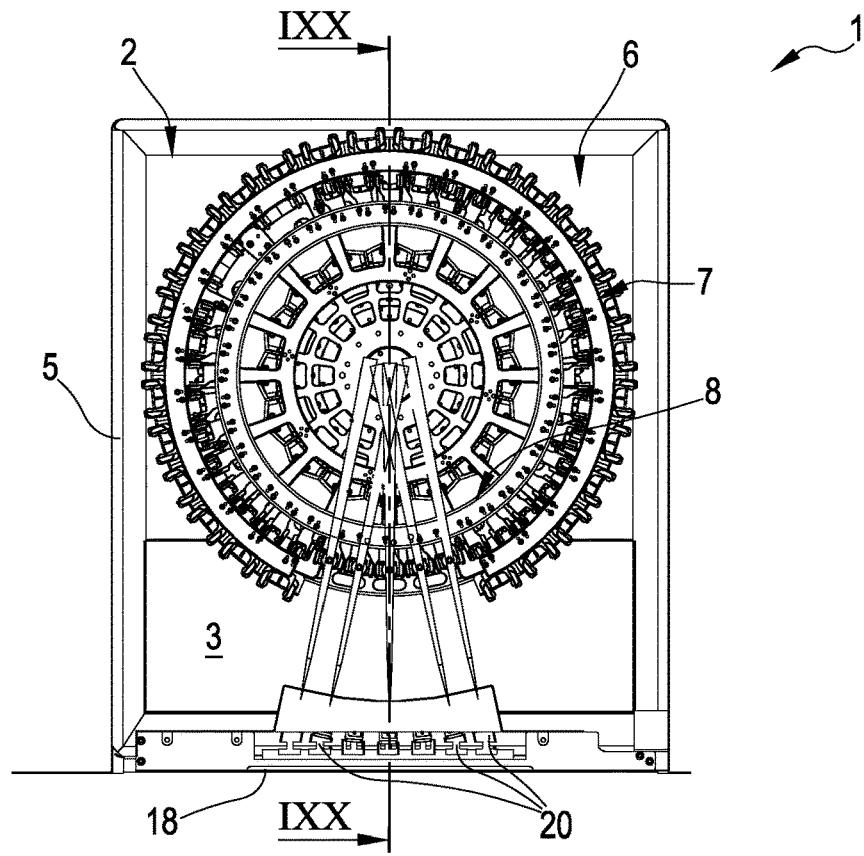
FIG. 18 is a partial view from above of a plant in accordance with the embodiments.
Figure 19:
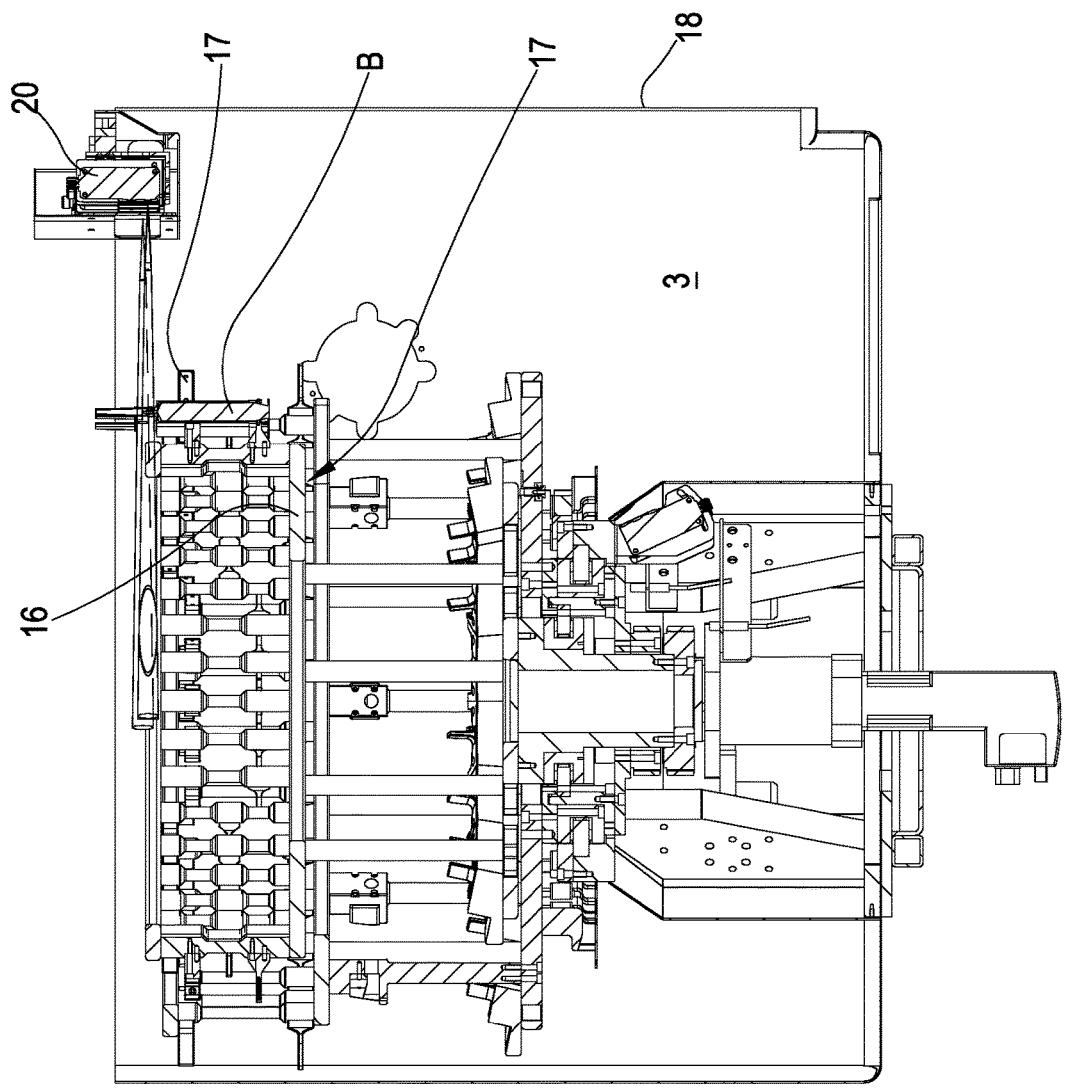
FIG. 19 is a section view, according to mark IXX-IXX of the FIG. 18 plant.
Figure 20:
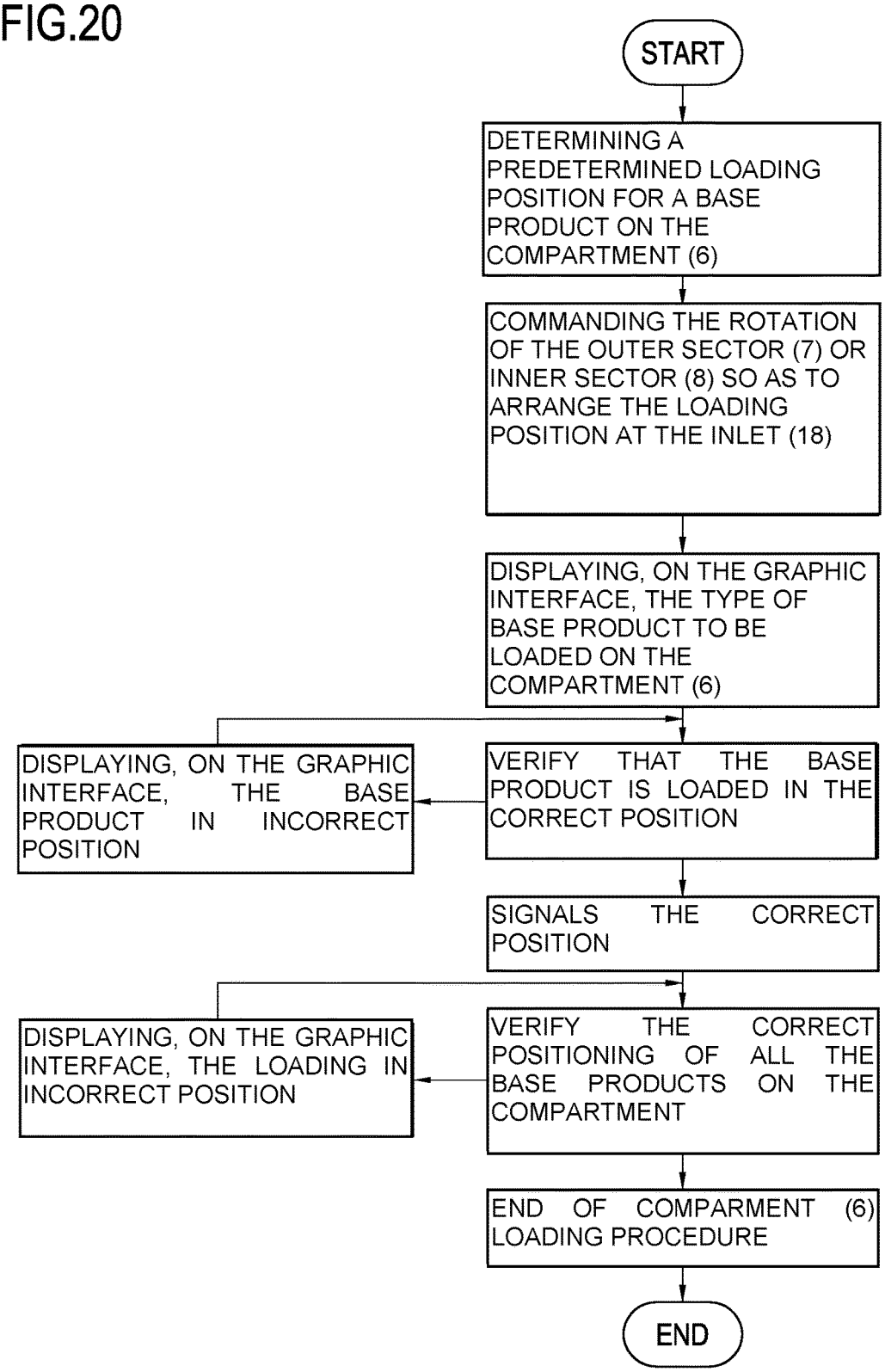
FIGS. 20 and 21 are flow charts of a process for the preparation of drugs, in accordance with the embodiments.
Figure 21:
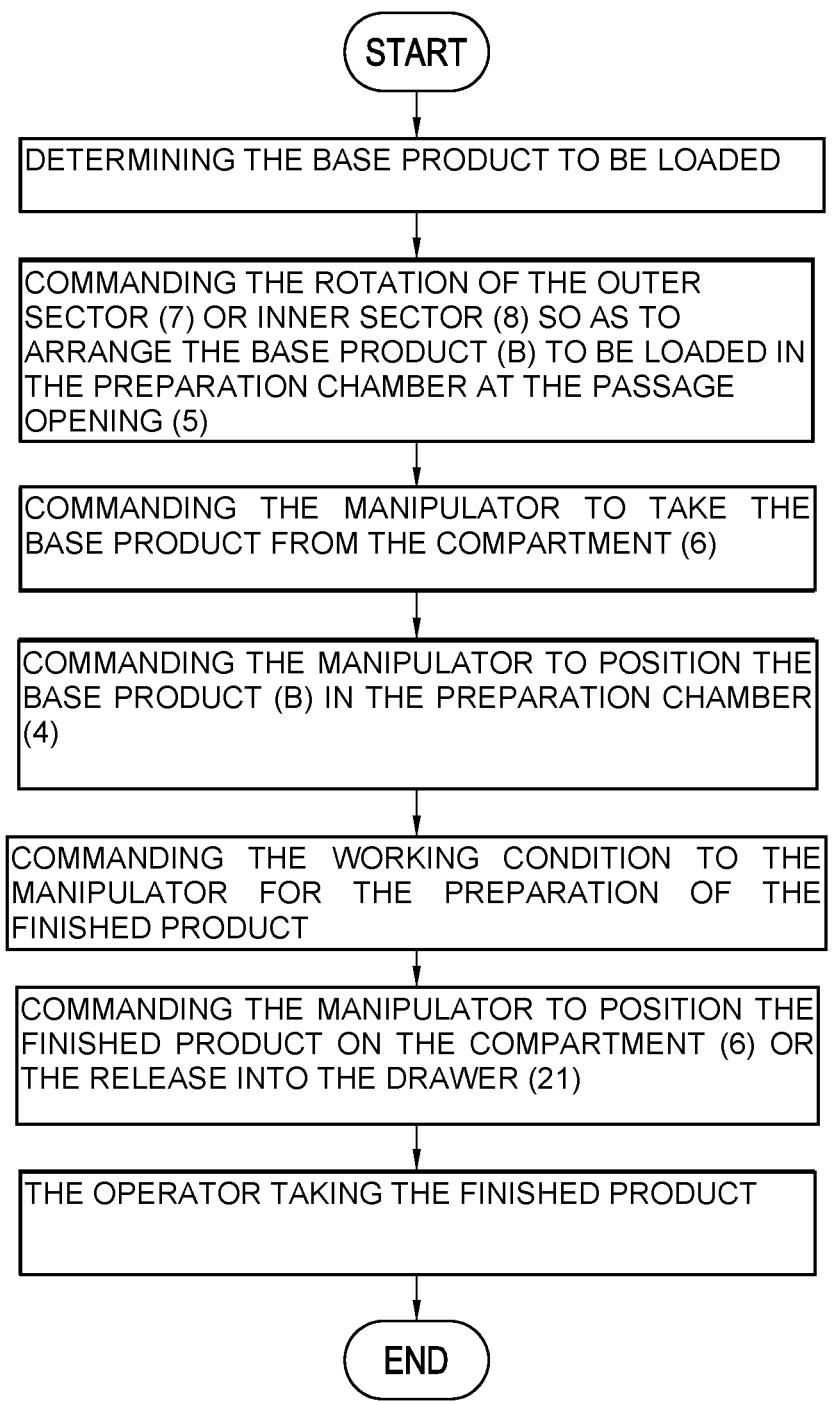

Advantageously plant 1 comprises at least one second sensor 20 (advantageously, in the annexed figures a plurality of second sensors 20 of plant 1 were shown) placed in the storage chamber 3, configured for issuing a control signal representative of the presence of a base component B at the predetermined loading position on the inner sector 8. Plant 1 can comprise only one sensor 20 able to detect one or more loading positions for each of the inner levels 16 present; alternatively, the plant can comprise one sensor 20 for each of the inner levels present, as illustrated for example by FIG. 11, 17-19. In particular, FIG. 11 shows a plurality of second sensors, each of which is able to detect at least one loading position on the lower inner level (level suitable for supporting bottles); each of such sensors 20, as illustrated for example in FIGS. 17-19 is also configured to detect at least one loading position on the upper inner level (level suitable for supporting syringes). The Control unit 10 is connected to the second sensor 20 and is configured for: receiving from the second sensor 20 the control signal; determining, based on the control signal, the presence of a base component B at the predetermined loading position; and optionally, if the presence of a base component (B) at the predetermined load position has been verified, identifying the base component and/or determining if the base component B is correctly positioned on the respective gripping member.

In fact, where the control unit has set a loading position on the inner sector, the same unit 10 rotates such sector so that such position results as facing the inlet 18: through sensor 20, the control unit 10 checks the effective presence of the base component B on the predetermined loading position. The second sensor 20 can advantageously comprise at least one selected from among the following groups: a presence detection sensor such as a mechanical, electromechanical or optical one; a proximity sensor, such as an inductive, capacitive, magnetic, ultrasonic or optical one; and a position sensor, such as an inductive, capacitive, magnetic, ultrasonic, or optical infrared one.

The control unit, through sensor 20, can also be configured to verify (in addition to the effective presence of the base component B at the predetermined loading position) if the component is in the correct position (if it was correctly engaged on the respective gripping member) or if the base component loaded is itself correct.

Following the determination of the presence of the base component B on the predetermined loading position of compartment 6, the control unit 10 is configured to command the rotation of compartment 6 so as to place the base component B, housed by the outer sector 7 or by the inner sector 8, at the passage opening 5. If the predetermined loading position is defined on the outer sector, the control unit 10 is configured to command the rotation of the outer sector 7 so as to take to base component B onto the predetermined loading position at the passage opening 5. If the predetermined loading position is defined on the inner sector 8, the control unit is configured for: commanding the rotation of the inner sector 8 to take the base component B placed in the predetermined loading position to the passage opening, following the determination of the presence of a base component (B) on the respective loading position on the inner sector, and commanding the rotation of the outer sector 7 in order to take the side opening 11 at the passage opening (5) so that the base component B can be taken from the outside, The control unit 10, following the positioning of the base component B at the passage opening 5, is configured for: commanding the loading condition to manipulator 9 so that the latter takes such base component B from the support element 6 and places it in the preparation chamber 4, and following, commanding the working condition to the manipulator 9 for the preparation of the finished product M.

The control unit 10 is configured to execute the process described above to load a plurality of base components B on the preparation chamber 4. Each base component B is temporarily engaged to a support element 26 housed in the preparation chamber 4. The manipulator 9 is configured to take the substances from the base components B engaged on the support element 26 and to combine them in order to obtain a drug (finished product).

The control unit 10, following the preparation of the finished product containing the drug, is configured for setting at least one predetermined unloading position of the finished product on the outer sector 7 or on the inner sector 8 of the compartment 6, defined at one of the gripping members of the outer 7 or inner sector 8. In the event that the predetermined unloading position is defined on the outer sector, the control unit 10 is configured to rotate the outer sector 7 so that the gripping member defining the predetermined unloading position of the finished product is at the passage opening 5. If, instead, the predetermined unloading position is defined on the inner sector, the control unit is configured for: rotating the inner sector 8 so that the gripping member defining the predetermined unloading position of the finished product is substantially facing the passage opening 5, and rotating the outer sector so that the side opening 11 results at the passage opening and the inner sector is reachable by the manipulator 9.

Following the determination of the unloading position, the control unit 10 is configured to command to the manipulator 9 a release condition in which the same places the finished product on the gripping member of the predetermined unloading position.

In the case where the predetermined unloading position is defined on the outer sector, the control unit 10 is configured putting into rotation the outer sector 7 so that the gripping member defining the predetermined unloading position of the finished product substantially faces the inlet 18. In the event, instead, where the predetermined unloading position results define the inner sector, the control unit 10 is configured to put in rotation the inner sector 7 so that the gripping member defining the predetermined unloading position of the finished product results substantially facing the inlet and eventually rotating the outer sector so that the side opening 11 is by the inlet and the inner sector is reachable by an operator or by an automated outer system.

In fact, control unit 10 is configured for determining the position where the finished product must be loaded on compartment 6 and for handling the inner and outer sector so that such position is first facing the passage opening 5, for the manipulator to load the product, and then facing inlet 18 in order to allow the operator or an outer automated system to take such product through inlet 18.

Figure 3:
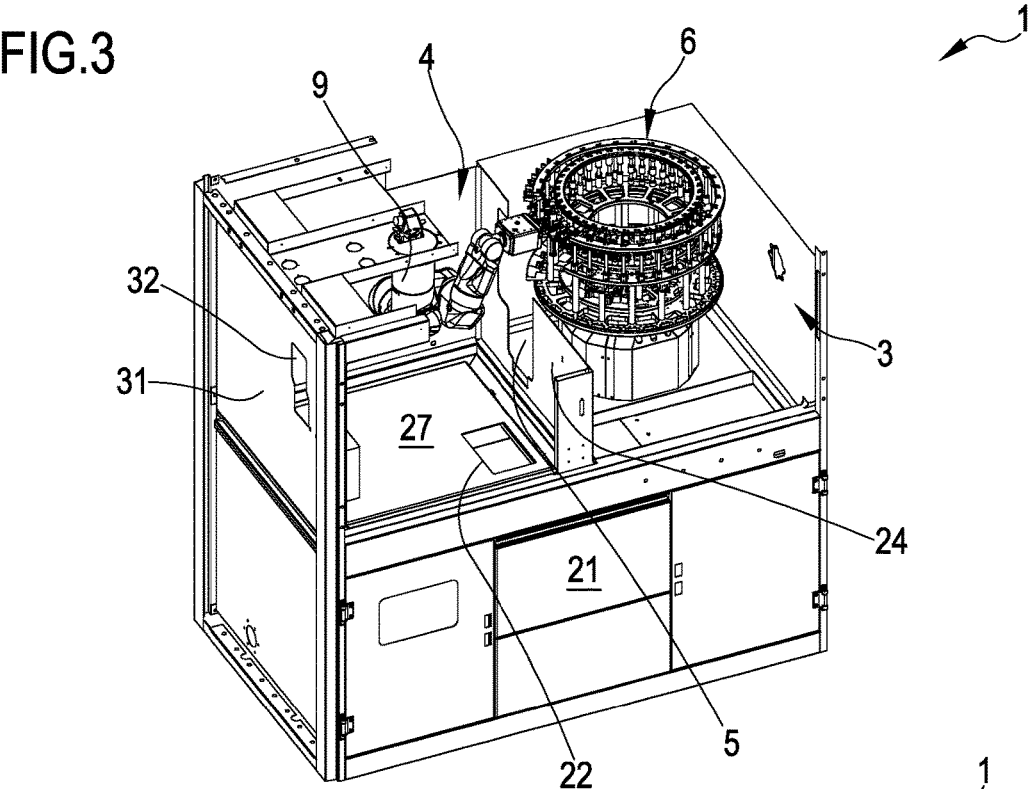
FIGS. 3 and 4 are respectively a partial frontal schematic view and a partial schematic perspective view of a plant in accordance with the present embodiments.
Figure 4:
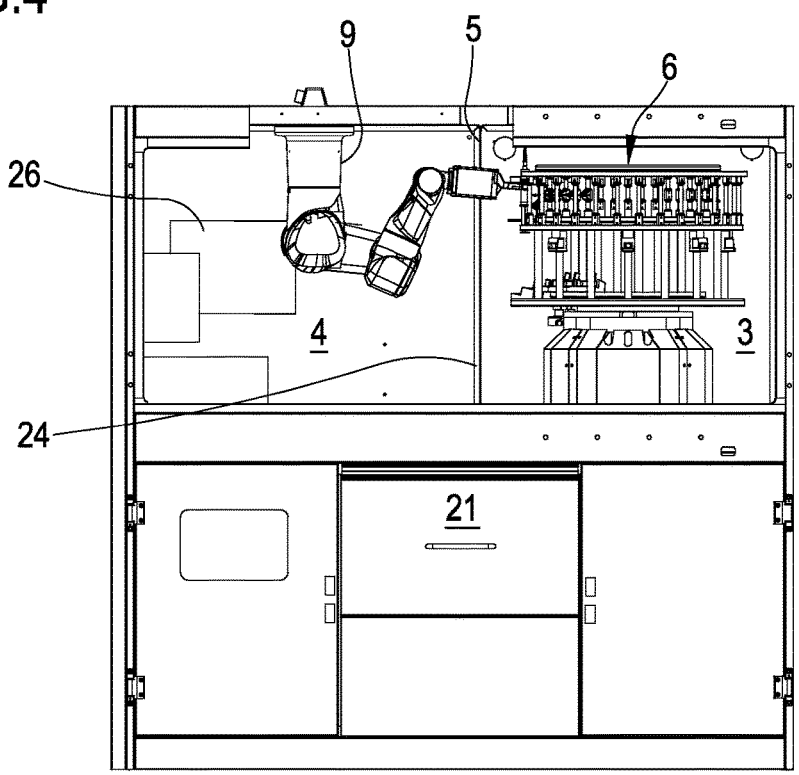
Figure 6:
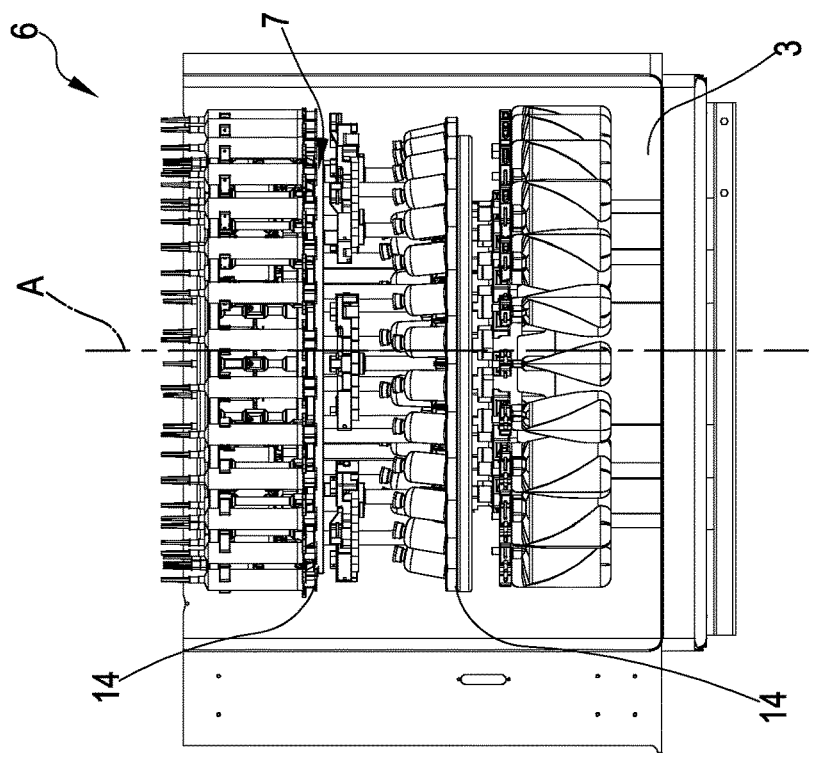
FIG. 6 is a schematic perspective view of a compartment of an installation in accordance with the present embodiments.

In a form of installation of plant 1, the casing 2 defines at least one unloading chamber which is different and separate from the storage chamber 3; the unloading chamber flanks the preparation chamber 4 and is divided from it through the interposition of a divider 27 (FIG. 3). In particular, the unloading chamber, with the plant in use, is placed underneath the preparation chamber and the storage chamber 3.

To the unloading chamber a drawer 21 may be associated, which is configured to position itself in a collection condition (FIG. 3), wherein the drawer 21 is engaged in the unloading chamber and in a collecting state and the drawer is at least partially positioned outside the unloading chamber, As shown in FIG. 3, the divider 27 comprises at least one unloading opening, configured to allow, at least in the drawer's collection state, communication between the unloading chamber and the preparation chamber 4. If the drawer 21 is present, the control unit 10—instead of positioning the finished products onto compartment 6—can also be configured to command to manipulator 9 a laying condition wherein the same lays the finished product M in the drawer 21 through the unloading opening 22.

The structure of compartment 6 featuring two sectors which are mobile with respect to each other independently is able to allow: the positioning, by an operator or an automated outer system, of one or more base components B from one sector and/or the taking of one or more finished products M, always by the operator or an automated outer system, from the same sector (laying or taking of base components and/or finished products from one sector), and, at the same time, execution of the loading state of manipulator 9 wherein the same takes one or more base components from one sector and positions them in the preparation chamber, and, always at the same time, execution of the unloading state of manipulator 9 wherein the same unloads one or more finished products on a sector and/or inside drawer 21.

FIG. 1 shows a scheme of a preferential configuration, without this representing a limitation to the embodiments, wherein plant 1 comprises a control module 28 flanking the storage chamber on the opposite side of the preparation chamber 4; the storage chamber 3 is interposed between the preparation chamber 4 and module 28. Advantageously, module 28 is configured to house the control unit 10, which is then connected to the manipulator 9, to compartment 6 (in particular, to the motors connected to the inner and outer sectors) as well as to the ventilation circuit 25.

As shown in FIG. 1, plant 1 can advantageously comprise a graphic interface 29 engaged, without this representing a limitation, with module 28 and connected to control unit 10. Control unit 10 is configured to send a signal containing at least one selected from among the following groups: at least one information on a base component B, for example, the type of component, the substance contained in the component, and the type of container of the component (bag, bottle, syringe); at least one information on the loading and/or unloading position of the base component; at least one information on one finished product, for example the type of product, the drug contained in the product and the type of container of the product (bag, bottle, syringe); at least one information on the loading and/or unloading position of the finished product; at least one information related to the type of drug in preparation in chamber 4; and at least one information related to the state, active/non-active, of the ventilation circuit 25.

In this way, the operator can visualize such information on the graphic interface, manage the base components placed on compartment 6 and the finished products placed on compartment 6 and unloaded on drawer 21.

Plant 1, as shown in FIG. 1, can also comprise one printing module 30 flanking the preparation chamber 4 on the opposite side to the storage chamber 3; the preparation chamber 4 is interposed between the storage chamber 3 and module 30. Module 30 features inside it a tray, separated from the preparation chamber 4 by means of a divider 31 (FIG. 3); on divider 31 is a passage opening 32 which puts into communication module 30's tray and preparation chamber 4.

Advantageously in module 30 a printing system 33 can be configured to print one or more labels for the identification of the finished product and to send such labels to the preparation chamber 4 through the passage opening 32. If the printing system 33 is present, the control unit 10 can be configured to command from manipulator 9 the collection of a label and the application of the same onto a predetermined finished product. In this way, finished products can be correctly classified by plant 1 before the same are removed by the operator.

Process for the Preparation of Drugs

In addition, the object of the embodiments is also a process for the preparation of drugs by means of a plant 1, in accordance with the description above and/or any of the annexed claims.

The process comprises a positioning step of a plurality of base components B on compartment 6. Such positioning step comprises at least the following sub-steps: setting a predetermined loading position on the outer sector at one of the gripping members of the same outer sector 7, eventually, rotating the outer sector 7 so that the gripping member defining the predetermined loading position of the base component B results as substantially facing inlet 18 of storage chamber 3, positioning the base component on the gripping member defining the predetermined loading position, repeating the previous steps for a further predetermined loading position defined on outer sector 7, and/or setting a predetermined loading position on the inner sector 8 defined at one of the gripping sectors of the same inner sector 8, eventually, rotating the inner sector 8 so that the gripping member defining the predetermined loading position of the base component B results as substantially facing inlet 18 of storage chamber 3, eventually, putting into rotation the outer sector 7 so that the side opening 11 faces the inlet 18 for enabling access from the outside to the predetermined loading position of the inner sector 8, positioning the base component on the gripping member defining the predetermined loading position on the inner sector 8, and repeating the previous steps for a further predetermined loading position defined on inner sector 8.

With each positioning of a base component B the procedure can involve a verification step for the presence of the base component B at the predetermined loading position; the verification step can also involve the correct positioning of the base component B on compartment 6 and that the correct type of base component B loaded. The verification step can be carried out through sensors 19, 20 and the control unit 10. During the verification step, the control unit commands to the graphic interface the visualization of the information on the base component B and, in particular, the presence of the same component on the predetermined loading position, the correct positioning of the component and the type of component to be loaded. In this way, the operator can visualize on the graphic interface all the necessary information in order to correctly load the base component on compartment 6.

If the base component B has not been loaded in the predetermined position, or if the component was loaded incorrectly, the control unit commands a visualization of the error to the graphic interface, so that the operator can restore the correct loading of the base component B on the loading position. Such procedure is executed for each base component B to be loaded into the compartment.

Following the positioning step of the products on compartment 6, the process comprises one rotation step of compartment 6 so as to place at least one base component B at the passage opening 5. In particular, the step of rotating the compartment 6 in order to arrange at least one base component B at the passage opening 5 comprises at least the following sub-steps: rotate the outer sector 7 so as to place at least one base component B substantially facing the passage opening 5, and/or rotate the inner sector 8 so as to place at least one base component B substantially facing the passage opening 5, and eventually rotating the outer sector 7 so that the side opening 11 faces the passage opening 5 for enabling access from the outside to the inner sector 8.

Following the positioning of a base component in the preparation chamber, the process comprises the following steps: rotating the compartment 6 in order to arrange at least one further base component (B) placed at the passage opening 5, taking the base component—placed at the passage opening 5—from the compartment 6 by means of the manipulator 9, and positioning the base component B that has been taken in the preparation chamber 4.

Each base component B—placed either on the outer sector or on the inner sector—taken at the passage opening 5 is taken by the manipulator and taken to the preparation chamber 4. Afterwards, the manipulator prepares at least one finished product in the preparation chamber 4 by combining substances from among the plurality of base components B.

Following the preparation of at least one finished product—the process comprises at least the following steps: taking, through the manipulator 9, such finished product, and positioning, always through the manipulator 9, the finished product on compartment 6 through the passage opening 5, and/or releasing the finished product in drawer 21 through the unloading opening.

As specified above for the plant, the preparation chamber's loading step, the positioning step of base components on a sector and the unloading step of the finished products can take place at the same time thanks to the presence of mobile sectors independent one from the other.

As described above, plant 1 can include a printing system. Therefore, the process can involve, following the preparation of the drug, the printing of an identification label for the drug and the application of the label onto the finished product containing the drug. Following the labeling of the finished product, the same is positioned (always by means of the manipulator 9) in the compartment 6 through the passage opening 5, and/or released in the drawer 21 through the unloading opening.

Aspects of the embodiments are described below.

The first aspect involves a plant (1) for the preparation of drugs including: a casing (2) defining at least one storage chamber (3) and at least one preparation chamber (4) flanked and communicating with each other by means of at least one passage opening (5); at least one compartment (6) located within the storage chamber (3) configured to receive a plurality of base components (B) for containing substances for the preparation of drugs, the compartment (6) at the same time comprising: at least one outer sector (7) configured to house a predetermined number of the base components (B) and to rotate around a respective axis (A), and at least one inner sector (8) configured to house a predetermined number of the base components (B) and to rotate around a respective axis (A), the inner sector (8) being at least partly housed in the outer sector (7); at least one manipulator (9) housed in the preparation chamber (4) and configured for defining a loading condition, wherein the manipulator (9) takes at least one base component (B) from the compartment, through the passage opening (5), and places it in the preparation chamber (4), the manipulator (9) being further configured for defining a working condition, wherein the manipulator (9) itself combines the substances contained in the base components (B) transported into the preparation chamber (4) for forming at least one finished product (M) containing a drug; and at least one control unit (10) connected to the compartment (6) and to the manipulator (9), the control unit (10) being configured for: commanding the compartment (6) to rotate in order to position at least one base component (B), housed in the outer sector (7) or in the inner sector (8), at the passage opening (5), commanding the loading condition to the manipulator (9) so that this latter takes the base component (B) from the compartment (6) and positions it in the preparation chamber (4), and commanding the working condition to the manipulator (9) for preparing the finished product (M).

In the second aspect, in accordance with the first aspect, the inner sector (8) presents an axis of rotation parallel to the axis of rotation of the outer sector (7).

In the third aspect, in accordance with the first or second aspects, the outer sector (7) features a substantially circular perimeter shape.

In the fourth aspect, in accordance with the first or second or third aspects, the inner sector (8) features a substantially circular perimeter shape.

In the fifth aspect, in accordance with any of the above aspects, both the outer sector and the inner sector feature, in plan view, a substantially circular perimeter shape and are placed in relation to each other in concentric positions.

In the sixth aspect, in accordance with any of the above aspects, the outer sector (7) and inner sector (8) feature the same rotation axis (A).

In the seventh aspect, in accordance with any of the above aspects, the outer sector (7) features a side opening (11) defining a side passage seat adapted to enable to gain access from the outside of the compartment to the inner sector (8).

In the eighth aspect, in accordance with the previous aspect, the outer sector (7) features, according to a cross section in relation to the respective rotation axis (A), a substantially circular open outline delimiting, at the aperture of the outline, the side opening (11).

In the ninth aspect, in accordance with any of the above aspects, the inner sector (7) features, according to a cross section in relation to the respective rotation axis (A) of such sector, a substantially circular closed outline.

In the tenth aspect, in accordance with any of the aspects from seventh to the ninth aspects, at least one portion of the inner sector (8) is positioned at the side passage seat of the outer sector (7).

In the eleventh aspect, in accordance with any of the aspects from seventh to tenth aspects, the side opening (11) of the outer sector (7) extends along the axis of the inner sector (8).

In the twelfth aspect, in accordance with any of the above aspects, the outer sector (7) comprises a plurality of outer levels (14) overlapped and consecutive to each other along a direction defined by the rotation axis (A) of the outer sector (7) itself, and wherein each outer level (14) comprises a plurality of gripping members (15), each of which is configured for engagingly receiving and supporting at least one base component (B), optionally the gripping members (15) of each outer level (14) are placed at an outer edge portion of the outer sector (7) along a substantially circular trajectory.

In the thirteenth aspect, in accordance with any of the above aspects, the inner sector (8) comprises a plurality of inner levels (16) overlapped and consecutive to each other along a direction defined by the rotation axis (A) of the inner sector (8) itself, and wherein each inner level (16) comprises a plurality of gripping members (17) each of which is configured for engagingly receiving and supporting at least one base component (B), optionally the gripping members (17) of each inner level (16) are placed at an outer edge portion of the inner sector (8) along a substantially circular trajectory.

In the fourteenth aspect, in accordance with the previous aspect(s), the inner levels (16) are aligned to the outer levels along a plane perpendicular to such axes of rotation of the inner and outer sectors.

In the fifteenth aspect, in accordance with the thirteenth or fourteenth aspects where the side opening (11) of the outer sector (7) axially extends along the entire height of the inner sector (8) along the plurality of its inner levels (16).

In the sixteenth aspect, in accordance with any of the above aspects, the outer and inner sectors (7, 8) are movable relatively with respect to each other, particularly by rotating about the same axis (A).

In the seventeenth aspect, in accordance with any of the above aspects, the plant comprises at least one first motor (12), or, optionally, an electric motor, connected to the outer sector (8), which is configured to rotate such outer sector around the axis (A); the plant (1) also comprising at least one second motor (13), or, optionally, an electric motor, connected to the inner sector (7), which is configured to rotate the outer sector (7) around the axis (A), the control unit (10), being connected to the first and second motor (12, 13) and being configured to command them, in an independent way, and to determine the rotation of the outer and inner sectors (7,8).

In the eighteenth aspect, in accordance with any of the above aspects, the outer sector (7) comprises at least one crown, inwardly having an open circular outline, and wherein, in a position radially inside the outer sector, is located the inner sector (8) comprising at least one crown, having a closed circular outline, at least the inner sector (8) defining a through seat extending along the entire length of the inner sector itself.

In the nineteenth aspect, in accordance with the previous aspect(s), the crown of the inner and outer sectors comprises a plurality of openings crossing the thickness of the crown, the plurality of crossing openings of the crown being uniformly distributed along the outline of this latter, in particular such crossing openings being distributed along the entire perimeter of the inner and/or outer sectors.

In the twentieth aspect, in accordance with any of the above aspects, the compartment (6) is extended between a first and second longitudinal end portions, the plant (1) comprising a ventilation circuit featuring at least one blowing opening and one intake opening defined on the walls of the storage chamber (3) opposite and respectively facing the first and second longitudinal end portions of the compartment (6), the ventilation circuit being configured for generating a gaseous fluid flow passing through the storage chamber (3) and adapted to strike the compartment (6) along a direction parallel to the rotation axis (A) of the first and second sectors.

In the twenty-first aspect, in accordance with the previous aspect(s), where the ventilation circuit is configured to generate a gaseous fluid flow through the crossing openings of the crowns of the inner and outer sectors, respectively, along a direction parallel to the axis of rotation (A) of the first and second sector.

In the twenty-second aspect, in accordance with any of the above aspects, the storage chamber (3) comprises an inlet (18) facing the compartment (6) along a direction perpendicular to the rotation axis (A) of the outer sector and/or inner sector (7, 8), the inlet (18) being configured for enabling an assigned operator or an external automatic system to gain access to the compartment (6).

In a twenty-third aspect in accordance with the previous aspect(s), opening passage (5) faces the compartment (6) and has an angular displacement compared to the inlet (18) by an angle ($\Delta$) measured according to a plane perpendicular to the axis of rotation (A) of the outer and inner sector (7, 8) and bordered by two imaginary rays having the same origin on such axis (A) and passing one through a centerline plan of the passage opening and the other through a centerline plan of the inlet in particular the above the angle is between 50° and 270°, optionally between 80° and 200°, even more specifically about 90°.

In the twenty-fourth aspect, in accordance with twenty-second or twenty-third aspects, the control unit (10) is configured to: determine at least one predetermined loading position of a base component (B) on the outer sector (7) of the compartment, defined at one of the outer sector's grippers (7), eventually, putting in rotation the outer sector (7) so that the gripping member defining the predetermined loading position of the base component (B) substantially faces the inlet (18) of the storage chamber (3), and/or determine at least one predetermined loading position of a base component (B) on the inner sector (7) of the compartment, defined at one of the inner sector's grippers (7), eventually, putting in rotation the outer sector (7) so that the gripping member defining the predetermined loading position of the base component (B) substantially faces the inlet (18) of the storage chamber (3), and eventually putting in rotation the outer sector (7) so that the side opening (11) faces the inlet (18) to enable access from the outside to the loading position of the inner sector (8).

In the twenty-fifth aspect, in accordance with the previous aspect(s), the plant comprises at least one first sensor (19), for example placed in the storage chamber (3), configured for emitting a control signal representative of the presence of a base component (B) at the predetermined loading position on the outer sector (7), the control unit (10) being connected to the first sensor (19) and being configured for: receiving from the first sensor (19) the control signal; determining, based on the control signal, the presence of a base component (B) at the predetermined loading position; and optionally, if the presence of a base component (B) at the predetermined loading position has been verified, identifying the base component (B) and/or determining if the base component (B) is correctly positioned on the respective gripping member.

In the twenty-sixth aspect, in accordance with the previous aspect(s), the control unit (10) is configured for: following the determination of the presence of a base component (B) on the respective loading position on the outer sector, commanding the rotation of the outer sector (7) for taking the base component (B) placed on the predetermined loading position at the passage opening (5), and following the rotation of the outer sector (7), commanding the loading position to the manipulator (9) so that it can take the base component (B) from the outer sector (7) and place it in the preparation chamber (4).

In the twenty-seventh aspect, in accordance with any of the previous aspects, the plant comprises at least one second sensor (20), for example placed in the storage chamber (3), configured for emitting a control signal representative of the presence of a base component (B) at the predetermined loading position on the inner sector (8), the control unit (10) being connected to the second sensor (20) and being configured for: receiving from the second sensor (20) the control signal; determining, based on the control signal, the presence of a base component (B) at the predetermined loading position on the inner sector (8); and optionally, if the presence of a base component (B) at the predetermined loading position on the inner sector has been verified, identifying the base component (B) and/or determining if the base component (B) is correctly positioned on the respective gripping member.

In the twenty-eighth aspect, in accordance with the previous aspect(s), the control unit (10) is configured for: following the determination of the presence of a base component (B) on the respective loading position on the inner sector, commanding the rotation of the inner sector (8) for taking the base component (B) placed on the predetermined loading position at the passage opening (5), following the determination of the presence of a base component (B) on the respective loading position on the inner sector, commanding the rotation of the outer sector (7) for taking the side opening (11) at the passage opening (5) so that the base component (B) can be taken from the outside, and following the rotation of the outer sector (7) and inner sector (8), commanding the loading position to the manipulator (9) so that it takes the base component (B) from the outer sector (7) and positions it in the preparation chamber (4).

In the twenty-ninth aspect, in accordance with any of the aspects from twenty-fifth to the twenty-eighth, the first sensor shall be formed of at least one selected from the following groups: a presence detection sensor such as a mechanical, electromechanical or optical one; a proximity sensor, such as an inductive, capacitive, magnetic, ultrasonic or optical one; and a position sensor, such as an inductive, capacitive, magnetic, ultrasonic, optical, or infrared one.

In the thirtieth aspect, in accordance with any of the aspects from twenty-seventh to twenty-ninth, the second sensor shall be formed of at least one selected from the following groups: a presence detection sensor such as a mechanical, electromechanical or optical one; a proximity sensor, such as an inductive, capacitive, magnetic, ultrasonic or optical one; and a position sensor, such as an inductive, capacitive, magnetic, ultrasonic, optical, or infrared one.

In the thirty-first aspect, in accordance with any of the aspects from twenty-second to the thirtieth, the control unit (10) is configured for: following command of the working condition and therefore, of the preparation of the finished product (M), determining at least one predetermined unloading position of the finished product (M) on the outer sector (7) or on the inner sector (8) of the compartment (6), defined at a gripping member of the outer (7) or inner sector (8) itself: if the predetermined unloading position is defined on the outer sector, eventually putting in rotation the outer sector (7) so that the gripping member defining the predetermined unloading position of the finished product (M) substantially faces the passage opening (5), and if the predetermined unloading position is defined on the inner sector, eventually putting in rotation the inner sector (8) so that the gripping member defining the predetermined unloading position of the finished product (M) substantially faces the passage opening (5), eventually putting in rotation the outer sector so that the side opening (11) is placed at the passage opening and the inner sector is reachable by the manipulator (9); and commanding a laying condition to the manipulator (9) wherein the same lays a finished product (M) on the gripping member of the predetermined unloading position: if the predetermined unloading position is defined on the outer sector, putting in rotation the outer sector (7) so that the gripping member defining the predetermined unloading position of the finished product (M) substantially faces the inlet (18), and if the predetermined unloading position is defined on the inner sector, putting in rotation the inner sector (7) so that the gripping member defining the predetermined unloading position of the finished product (M) substantially faces the inlet (18), eventually putting in rotation the outer sector (7) so that the side opening (11) faces the inlet (18) for enabling an operator or an external automatic system to gain access from the outside to the loading position of the inner sector (8).

In the thirty-second aspect, in accordance with any of the above aspects, the casing (2) provides at least one unloading chamber, separate from the storage chamber (3), the unloading chamber flanking the preparation chamber (4) and divided from it by means of at least one divider, wherein the plant (1) comprises at least one drawer (21) which can be associated to the unloading chamber which is configured to position itself in a collection state, wherein the drawer is engaged in the unloading chamber and in a collecting state wherein the drawer is at least partially positioned outside the unloading chamber, the divider comprises at least one unloading opening (22) configured to allow, at least in the drawer's collection state, communication between the unloading chamber and the preparation chamber, and wherein the control unit (10), following the command of working condition and therefore, of the preparation of the finished product (M), is configured for commanding a laying condition to the manipulator (9) wherein the same lays a finished product (M) on the drawer (21) through the unloading opening (22).

In the thirty-third aspect, a process for the preparation of drugs is provided, through a plant (1) in accordance with any of the previous aspects, such process comprising at least the following steps: positioning a plurality of base components (B) on the compartment (6), rotating the compartment (6) in order to arrange at least one base component (B) at the passage opening (5), taking the base component (B), placed at the passage opening (5), from the compartment (6) by means of the manipulator (9), positioning the taken base component (B) in the preparation chamber (4), and preparing, through the manipulator (9), at least one finished product (M) in the preparation chamber through the combination of a plurality of base components (B).

In the thirty-fourth aspect, in accordance with the previous aspect(s), the process comprises the following steps: following the positioning of a base component (B) in the preparation chamber, rotating the compartment (6) in order to arrange at least one further base component (B) at the passage opening (5); taking a further base component, placed at the passage opening (5), from the compartment (6) by means of the manipulator (9); positioning the taken base component (B) in the preparation chamber (4); and combining, through the manipulator (9) the substances contained at least in the base component and in the further base component brought into the preparation chamber (4) in order to create at least one finished product (M) containing a drug.

In the thirty-fifth aspect, in accordance with the thirty-third or thirty-fourth aspects, the positioning step of a plurality of base components (B) on the compartment (6) comprises at least the following steps: determining at least one predetermined loading position on the outer sector (7), defined at one of the outer sector's grippers (7); eventually, putting in rotation the outer sector (7) so that the gripping member defining the predetermined loading position of the base component (B) substantially faces the inlet (18) of the storage chamber (3); positioning the base component on the gripping member defining the predetermined loading position; and repeating the previous steps for a further predetermined loading position defined on the outer sector (7); and/or determining a predetermined loading position on the inner sector (8) defined at one of the gripping members of the inner sector (8); eventually, putting in rotation the inner sector (8) so that the gripping member defining the predetermined loading position of the base component (B) substantially faces the inlet (18) of the storage chamber (3); eventually, putting in rotation the outer sector (7) so that the side opening (11) faces the inlet (18) for enabling access from the outside to the loading position of the inner sector (8); positioning the base component on the gripping member defining the predetermined loading position on the inner sector (8); and repeating the previous steps for a further predetermined loading position defined on the inner sector (8).

In the thirty-sixth aspect, in accordance with the previous aspect(s) where, following the positioning of the base component on the compartment (6) and previously, the rotation step of the latter, the process provides for a verification step comprising at least one of the following sub-steps: determining the presence of a base component (B) at the predetermined loading position; and determining the correct position of the base component at the predetermined loading position; checking if the loaded component corresponds to the base component (B) expected for such predetermined loading position; in particular, this step includes the identification of the base component and therefore, of the substance contained in it.

In the thirty-seventh aspect, in accordance with any of the aspects from the thirty-third to the thirty-sixth, the step of rotating the compartment (6) in order to arrange at least one base component (B) at the passage opening (5) comprises at least the following sub-steps: rotating the outer sector (7) in order to place at least one base component (B) substantially facing the passage opening (5); and/or rotating the inner sector (8) in order to place at least one base component (B) substantially facing the passage opening (5), eventually putting in rotation the outer sector (7) so that the side opening (11) faces the passage opening (5) for enabling access from the outside to the inner sector (8), wherein each base component (B), placed either on the outer or inner sector, taken to the passage opening (5) is collected by the manipulator and taken into the preparation chamber (4).

In the thirty-eighth aspect, in accordance with any of the aspects from thirty-third to the thirty-seventh, following the preparation of at least one finished product (M), the process comprises at least the following steps: taking, with the manipulator (9), such finished product (M), and placing, always with the manipulator (9), the finished product (M) on the compartment (6) through the passage opening (5) and/or releasing the finished product (M) in the drawer through the unloading opening.

In the thirty-ninth aspect a compartment is provided for, in particular for plant for the preparation of drugs, the compartment (6) being configured to receive a plurality of base components (B) for containing substances for the preparation of drugs, such compartment (6) including: at least one outer sector (7) configured to house a predetermined number of base components (B) and to rotate around a respective axis (A), and at least one inner sector (8) configured to house a predetermined number of base components (B) and to rotate around a respective axis (A), the Inner sector (8) being at least partly housed in the outer sector (7).

In the fortieth aspect, in accordance with the thirty-ninth aspect, wherein the compartment (6) complies with the features of any of the aspects from the second to the twentieth.

In the forty-first aspect, use of the compartment (6) is provided for, in accordance with any of the previous aspects, for the support and handling of: a plurality of finished products containing drugs; and a plurality of basic products, each of which can contain a solution for the composition of the finished product.

Advantages

The embodiments shown and described allow for the achievement of considerable advantages and to overcome the limits of prior art. In fact, the structure featuring outer and inner sectors of the compartment allows for a considerable increase in the production capacity of plant 1, maintaining a simple and compact structure. In fact, compartment 6 allows the loading of the base components both on the inner sector 8 as well as on outer sector 7. The high number of base components which can be loaded in the compartment reduces the number of downtimes for the loading of the compartment 6 and increases the system's range: thanks to this structure for the compartment, it is possible to carry out a large number of drug preparations. Plant 1 is also flexible in its use, as it can be used for the production of any type of drug, both in limited as well as large quantities.

It is also to be noted that the structure of compartment 6 with independent mobile sectors allows it to carry out at the same time and in all safety the preparation chamber's loading steps, the steps of positioning of the base components on the sectors and the unloading of the finished products.

It is also to be noted that the possibility of loading of the components/products on the different sectors (inner and outer sectors) can considerably reduce the possibility for mistakes on the part of the operator during the steps of loading and unloading of the components and of the finished products. In fact, plant 1 has the possibility of devoting, for example, at least one section of the inner or outer sector to the positioning of the finished products; this way, the operator can quickly distinguish a base component from a finished product, as ever on the basis of their position in the compartment.

It is to be noted also that the particular structure of sectors 7,8, comprising crowns on which a plurality of transverse openings are defined, greatly facilitates the passage of material generated by the ventilation circuit 25. In particular, the openings feature a special shape and are placed on the sectors to as to enable to the gaseous fluid flow generated by ventilation circuit 25 to carry out a washing of the surfaces of compartment 6, in order to ensure, both inside chamber 3, as well as inside preparation chamber 4, an appropriate level of sterility.

The structure of compartment 6, along with the control systems defined by unit 10 and sensors 19, 20, allow for the provision of a plant for the preparation of drugs which is able to avoid incorrect loading of basic substances and, ultimately, the incorrect preparation of drugs.

What is claimed is:

1. A plant for preparing drugs comprising:
   a casing defining at least one storage chamber and at least one preparation chamber flanked and communicating with each other by means of at least one passage opening,
   at least one compartment disposed inside the storage chamber and configured to receive a plurality of base components adapted to contain substances for preparing drugs, such compartment in turn including:
     at least one outer sector configured to house a predetermined number of the base components and to rotate around a first rotation axis, and
     at least one inner sector configured to house a predetermined number of the base components and to rotate around a second rotation axis, the inner sector being at least partly housed in the outer sector,
   at least one manipulator housed in the preparation chamber and configured for defining a load condition, wherein the manipulator takes at least one base component from the compartment, through the passage opening, and places it in the preparation chamber, the manipulator being further configured for defining a working condition, wherein the manipulator itself combines the substances contained in the base components transported into the preparation chamber for forming at least one finished product containing a drug, and
   at least one control unit connected to the compartment and to the manipulator, the control unit configured to:
     command the compartment to rotate in order to position at least one base component, housed in the outer sector or in the inner sector, at the passage opening,
     command the load condition to the manipulator so that the manipulator takes the base component from the compartment and positions the base component in the preparation chamber, and
     command the working condition to the manipulator to prepare the finished product.

2. The plant according to claim 1, wherein the outer sector and the inner sector of the compartment exhibit a circular perimeter shape and are concentrically arranged, wherein the outer sector and the inner sector have a common rotation axis.

3. The plant according to claim 1, wherein the outer sector exhibits a side opening defining a side passage seat adapted to enable access from the outside of the compartment to the inner sector,
   wherein the outer sector exhibits, according to a section transverse to the first rotation axis, a circular open outline delimiting, at an aperture of the circular open outline, the side opening, and
   wherein the inner sector exhibits, according to the section transverse to the second rotation axis of the sector itself, a circular closed outline, at least one portion of the inner sector being arranged at the side passage seat of the outer sector.

4. The plant according to claim 1, wherein the outer sector comprises a plurality of outer levels overlapped and consecutive to each other along a direction defined by the first rotation axis, and wherein each outer level comprises a plurality of gripping members, each configured to engagingly receive and support at least one base component.

5. The plant according to claim 4, wherein the inner sector comprises a plurality of inner levels overlapped and consecutive to each other along a direction defined by the second rotation axis, and wherein each inner level comprises a plurality of gripping members each configured to engagingly receive and support at least one base component.

6. The plant according to claim 4, wherein the gripping members of each level are placed at an outer edge portion of the outer sector along a circular trajectory.

7. The plant according to claim 4, wherein the gripping members of each inner level are placed at an outer edge portion of the inner sector along a circular trajectory.

8. The plant according to claim 4, wherein the side opening of the outer sector axially extends a height of the inner sector along a plurality of inner levels of the inner sector.

9. The plant according to claim 1, wherein the outer and inner sectors are relatively movable with respect to each other.

10. The plant according to claim 1, wherein the outer sector and the inner sector of the compartment exhibit a circular perimeter shape and are concentrically arranged, wherein the outer sector and the inner sector have the same rotation axis, the outer and inner sectors relatively movable by rotating about a common axis.

11. The plant according to claim 1, further comprising:
    at least one first motor connected to the outer sector, the first motor configured to put in rotation the outer sector around the first axis;
    at least one second motor connected to the inner sector, the second motor configured to put in rotation the outer sector around the second axis, and
    the control unit connected to the first and second motors, and the control unit configured to independently command the first and second motors to determine the rotation of the outer and inner sectors.

12. The plant according to claim 1, wherein the outer sector comprises at least one crown inwardly having an open circular outline, and wherein, in a position radially inside the outer sector, there is the inner sector comprising at least one crown having a closed circular outline, at least the inner sector defining a through seat extending all along the development of the inner sector, wherein the crown of the inner sector and the crown of the outer sector comprise a plurality of openings crossing a thickness of the crown, the plurality of crossing openings of the crown being uniformly distributed.

13. The plant according to claim 12, further comprising a ventilation circuit exhibiting at least one blowing opening and one intake opening defined on the walls of the storage chamber opposite and facing the first and second longitudinal end portions of the compartment, the ventilation circuit configured to generate a gaseous fluid flow passing through the storage chamber and adapted to hit the compartment along a direction parallel to the first and to the second rotation axes through the through-openings of the crowns of the inner and outer sectors, respectively.

14. The plant according to claim 1, wherein the storage chamber comprises an inlet facing the compartment along a direction perpendicular to at least one of the first rotation axis and the second rotation axis, the inlet configured to enable access to the compartment, wherein the control unit is configured to:

determine at least one predetermined loading position of a base component on the outer sector of the compartment, defined at a gripping member of the outer sector itself, and put in rotation the outer sector so that the gripping member defining the predetermined loading position of the base component faces the inlet of the storage chamber, and determine at least one predetermined loading position of a base component on the inner sector of the compartment, defined at a gripping member of the inner sector itself, put in rotation the outer sector so that the gripping member defining the predetermined loading position of the base component faces the inlet of the storage chamber, and put in rotation the outer sector so that the side opening faces the inlet to enable access from the outside to the loading position of the inner sector.

15. The plant according to claim 1, further comprising at least one first sensor configured for emitting a control signal representative of the presence of a base component at the predetermined loading position on the outer sector, the control unit being connected to the first sensor and being configured for:

receiving, from the first sensor, the control signal;

determining, based on the control signal, the presence of a base component at the predetermined loading position;

if the presence of a base component at the predetermined load position has been verified, identifying the base component and/or determining if the base component is correctly positioned on a respective gripping member, wherein the control unit is configured for:

following the determination of the presence of a base component on the respective loading position on the outer sector, commanding the rotation of the outer sector for taking the base component placed on the predetermined loading position at the passage opening, following the rotation of the outer sector, commanding the loading position to the manipulator so that the latter takes the base component from the outer sector and positions it in the preparation chamber.

16. The plant according to claim 14, further comprising at least one second sensor configured to emit a control signal representative of presence of a base component at the predetermined loading position on the inner sector, the control unit being connected to the second sensor and being configured to:

receive, from the second sensor, the control signal;

determine, based on the control signal, the presence of a base component at the predetermined loading position on the inner sector;

if the presence of a base component at the predetermined loading position on the inner sector has been verified, identify the base component and/or determining if the base component is correctly positioned on the respective gripping member, wherein the control unit is configured to:

follow the determination of the presence of a base component on the respective loading position on the inner sector, command the rotation of the inner sector for taking the base component placed on the predetermined loading position at the passage opening, follow determination of the presence of a base component on the respective loading position on the inner sector, command the rotation of the outer sector for taking a side opening at the passage opening so that the base component may be taken from the outside, and follow the rotation of the outer sector and inner sector, command the loading position to the manipulator so that the latter takes the base component from the inner sector and positions it in the preparation chamber.

17. The plant according to claim 11, wherein the control unit is configured to:

follow the command of the working condition and therefore, of the preparation of the finished product, determining at least one predetermined unloading position of the finished product on the outer sector or on the inner sector of the compartment, defined at a gripping member of the outer or inner sector itself, if the predetermined unloading position is defined on the outer sector, putting in rotation the outer sector so that the gripping member defining the predetermined unloading position of the finished product faces the passage opening, if the predetermined unloading position is defined on the inner sector, putting in rotation the inner sector so that the gripping member defining the predetermined unloading position of the finished product faces the passage opening, putting in rotation the outer sector so that the side opening is placed at the passage opening and the inner sector is reachable by the manipulator, command a laying condition to the manipulator wherein the same lays a finished product on the gripping member of the predetermined unloading position, if the predetermined unloading position is defined on the outer sector, putting in rotation the outer sector so that the gripping member defining the predetermined unloading position of the finished product faces the inlet, if the predetermined unloading position is defined on the inner sector, putting in rotation the inner sector so that the gripping member defining the predetermined unloading position of the finished product faces the inlet, putting in rotation the outer sector so that the side opening is placed at the inlet and the inner sector reachable by an operator or an external automatic system.

18. The plant according to claim 1, wherein the casing defines at least one unloading chamber distinct and separated from the storage chamber, the unloading chamber flanking the preparation chamber and divided by at least one divider, wherein the plant comprises at least one drawer which can be associated to the unloading chamber which is configured to position itself in a collection state, wherein the drawer is engaged in the unloading chamber and in a collecting state wherein the drawer is at least partially positioned outside the unloading chamber, the divider comprises at least one unloading opening configured to allow, at least in the drawer's collecting state, communication between the unloading chamber and the preparation chamber, and wherein the control unit, following the command of working condition and therefore, of the preparation of the finished product, is configured to command a laying condition to the manipulator wherein the same lays a finished product on the drawer through the unloading opening.

* * * * *